(12) United States Patent
Kitagishi et al.

(10) Patent No.: US 9,074,787 B2
(45) Date of Patent: Jul. 7, 2015

(54) OPERATION CONTROLLER FOR COMPRESSOR AND AIR CONDITIONER HAVING THE SAME

(75) Inventors: Masamitsu Kitagishi, Osaka (JP); Ryouta Takechi, Osaka (JP); Masao Igata, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 1087 days.

(21) Appl. No.: 12/680,396

(22) PCT Filed: Sep. 29, 2008

(86) PCT No.: PCT/JP2008/002719
§ 371 (c)(1),
(2), (4) Date: Mar. 26, 2010

(87) PCT Pub. No.: WO2009/041075
PCT Pub. Date: Apr. 2, 2009

(65) Prior Publication Data
US 2010/0218527 A1    Sep. 2, 2010

(30) Foreign Application Priority Data
Sep. 28, 2007   (JP) .................................. 2007-253447

(51) Int. Cl.
  *F25B 49/00*   (2006.01)
  *F24F 11/00*   (2006.01)
  *F25B 49/02*   (2006.01)

(52) U.S. Cl.
  CPC ............. *F24F 11/008* (2013.01); *F25B 49/025* (2013.01); *F25B 2600/021* (2013.01); *F25B 2600/0251* (2013.01); *F25B 2700/1931* (2013.01); *F25B 2700/1933* (2013.01); *F25B 2700/2116* (2013.01); *F25B 2700/2117* (2013.01); *F25B 2700/21173* (2013.01); *Y02B 30/741* (2013.01)

(58) Field of Classification Search
  CPC .................................................. F25B 2600/021
  USPC ................................... 62/228.1, 228.4, 228.5
  See application file for complete search history.

(56) References Cited

U.S. PATENT DOCUMENTS 4,679,403 A * 7/1987 Yoshida et al. ................. 62/114
4,718,247 A * 1/1988 Kobayashi et al. .......... 62/228.4

(Continued)

FOREIGN PATENT DOCUMENTS

CN     1038512 A    1/1990
JP     6-11173 A    1/1994

(Continued)

*Primary Examiner* — M. Alexandra Elve
*Assistant Examiner* — Henry Crenshaw
(74) *Attorney, Agent, or Firm* — Birch, Stewart, Kolasch & Birch, LLP

(57) ABSTRACT

The present invention provides a configuration in which a compressor can be controlled using an inverter in an air conditioner where only a signal related to ON/OFF of the compressor is output from a control terminal. An operation controller for a compressor is configured so that the compressor can be controlled using an inverter based on an ON signal output from a control interface of an air conditioner. Specifically, a target value of at least one of an outlet air temperature, an evaporation temperature and a condensation temperature, and a suction pressure and a discharge pressure of the compressor is corrected according to a duration of the ON signal or a duration of the OFF state thereof, thereby controlling the frequency of the compressor.

9 Claims, 11 Drawing Sheets

(56) References Cited

U.S. PATENT DOCUMENTS

| | | | |
|---|---|---|---|
| 4,720,981 A * | 1/1988 | Helt et al. | 62/113 |
| 4,774,816 A * | 10/1988 | Uchikawa et al. | 62/324.1 |
| 4,891,953 A | 1/1990 | Isono | |
| 4,939,909 A * | 7/1990 | Tsuchiyama et al. | 62/158 |
| 5,586,444 A * | 12/1996 | Fung | 62/117 |
| 6,134,901 A * | 10/2000 | Harvest et al. | 62/228.4 |
| 6,508,072 B1 * | 1/2003 | Kanazawa et al. | 62/228.4 |
| 2002/0006537 A1 * | 1/2002 | Kobayashi et al. | 429/26 |
| 2006/0048531 A1 * | 3/2006 | Eisenhour | 62/228.3 |
| 2006/0130504 A1 * | 6/2006 | Agrawal et al. | 62/228.4 |
| 2006/0158796 A1 * | 7/2006 | Butcher et al. | 361/22 |
| 2006/0247827 A1 * | 11/2006 | Fukasaku et al. | 700/299 |
| 2007/0144190 A1 * | 6/2007 | Temmyo et al. | 62/180 |

FOREIGN PATENT DOCUMENTS

| | | |
|---|---|---|
| JP | 2003-106615 A | 4/2003 |
| JP | 2004-144323 A | 5/2004 |
| JP | 2005-30679 A | 2/2005 |
| JP | 2006-275460 A | 10/2006 |
| JP | 2007-10200 A | 1/2007 |

* cited by examiner

OPERATION CONTROLLER FOR COMPRESSOR AND AIR CONDITIONER HAVING THE SAME

TECHNICAL FIELD

The present invention relates to an air conditioner in which a compressor is controlled using an inverter.

BACKGROUND ART

In a conventional air conditioner known in the art, the compressor is controlled using an inverter so as to bring the indoor air temperature closer to an optimal temperature. Such an air conditioner controls the operation of the compressor based on the designated temperature, the indoor air temperature, the outlet air temperature, the suction pressure and the discharge pressure of the compressor, etc., as disclosed in Patent Document 1, for example. That is, an ordinary air conditioner detects, in addition to the indoor air temperature, at least one of the outlet air temperature, the suction pressure and the discharge pressure of the compressor, etc., and the operation of the compressor is controlled so as to bring these detected values closer to predetermined target values. Note that the designated temperature is typically set by operating a remote controller, and the designated temperature, the indoor air temperature, the outlet air temperature, and the suction pressure and the discharge pressure of the compressor are subjected to signal processing in the controller of the air conditioner, after which an inverter control signal is output from the controller to the compressor.

For air conditioners widely used in Japan, etc., it is a well known configuration where the compressor is controlled using an inverter as described above, but air conditioners widely used in North America, etc., typically have a unit called a "thermostat" (control interface), which is a remote controller with a function of the controller. The thermostat detects the indoor air temperature, and compares the detected indoor air temperature with the designated temperature so as to output an ON/OFF control signal to the compressor based on the comparison result.

CITATION LIST

Patent Document

PATENT DOCUMENT 1: Japanese Laid-Open Patent Publication No. 2005-30679

SUMMARY OF THE INVENTION

Technical Problem

Now, in an air conditioner of North America having a thermostat, which is a remote controller with a function of the controller, as described above, since the signal output from the thermostat is a signal that instructs ON/OFF of the compressor, the compressor cannot be controlled using an inverter. Therefore, the indoor air temperature cannot be brought close to the designated temperature with a high precision, and it was inferior to a Japanese air conditioner in terms of the level of energy conservation and comfort, etc.

In view of this, one may consider installing such a remote controller as those widely used in Japan, etc., in place of a thermostat described above, while separately providing a controller capable of an inverter control, but it is difficult in terms of the cost, etc., to develop corresponding remote controllers and air conditioners in place of thermostats whose range of variety is wide and which are widely used in North America.

The present invention has been made in view of the above, and has an object to realize a configuration where a compressor can be controlled using an inverter, for an air conditioner in which only a signal related to ON/OFF of the compressor is output from a control terminal.

Solution to the Problem

In order to achieve the object set forth above, in an operation controller (3) for a compressor (11) according to a first aspect, the compressor (11) is controlled using an inverter based on an ON signal output from a control terminal (50).

Specifically, the first aspect is directed to an operation controller for a compressor for turning ON/OFF the compressor (11) based on the ON signal output from the control terminal (50). It is so configured that the compressor (11) is controlled based on the ON signal using an inverter.

With such a configuration, even if data such as the indoor air temperature and the designated temperature cannot be obtained from the control terminal (50), the difference between the indoor air temperature and the designated temperature, i.e., the load required for air-conditioning the room, can be estimated based on the ON signal output from the control terminal (50). Therefore, only with the ON signal, the compressor (11) can be controlled using an inverter, and it is possible to condition the air so as to achieve a comfortable indoor air temperature.

The operation controller (3) is configured so that the compressor (11) is controlled using an inverter according to a duration of the ON signal or a duration of an OFF state where the ON signal is not output (second aspect).

Thus, even with a configuration where only the ON signal to the compressor (11) is output from the control terminal (50), the compressor (11) can be controlled using an inverter based on the ON signal. That is, if the duration of the ON signal to the compressor (11) has been a predetermined amount of time or more, it is estimated that the load required for bringing the indoor air temperature closer to the designated temperature is accordingly higher, and therefore such a control is performed as to increase the operation capacity of the compressor (11). On the other hand, if the duration of the OFF state where the ON signal to the compressor (11) is not output has been a predetermined amount of time or more, it is determined that the load required for bringing the indoor air temperature closer to the designated temperature is low, and therefore such a control is performed as to decrease the operation capacity of the compressor (11). With a configuration where an ON signal is output, with which the load of the compressor (11) can be changed stepwise, it is possible to perform such a control using an inverter that the amount by which the capacity of the compressor (11) is increased can be changed according to the switching of the load, whereas when a predetermined amount of time elapses from when the load is switched to be lower, it is determined that the operation capacity of the compressor (11) can be decreased with no problems, and the operation capacity of the compressor (11) is decreased.

Therefore, by taking into consideration the duration of the ON signal to the compressor (11) or the duration of the OFF state thereof as described above, it is possible to estimate the load required for the compressor (11), and it is therefore possible to control the compressor (11) using an inverter.

The operation controller (3) is configured so that a target value of at least one of an indoor outlet air temperature of an air conditioner (1) including the compressor (11), and a suction pressure and a discharge pressure of the compressor (11) is changed according to either the duration of the ON signal or the duration of the OFF state where the ON signal is not output, and the compressor (11) is controlled using an inverter based on the target value (third aspect).

Thus, where the operation of the air conditioner (1) is controlled based on one of the outlet air temperature, and the suction pressure and the discharge pressure of the compressor (11), the target value thereof is changed according to either the duration of the ON signal output from the control terminal (50) or the duration of the OFF state thereof, and it is therefore possible to control the frequency of the compressor (11) according to the target value. Therefore, with such a configuration, the frequency of the compressor (11) can be controlled using an inverter based on the ON signal, thereby realizing the configuration of the second aspect described above.

Specifically, it is preferred that the target value is changed in a capacity-increasing direction if the ON signal has been output continuously for a predetermined amount of time or more (fourth aspect). Thus, when the ON signal has been output from the control terminal (50) continuously for a predetermined amount of time or more, i.e., when a large air conditioning capacity is being required, it is possible to increase the output of the compressor (11) by changing the target value in the capacity-increasing direction.

It is preferred that the target value is changed in a capacity-increasing direction if the ON signal has been output continuously for a predetermined period of time during a compressor protection period in which an activation of the compressor (11) is prohibited over a certain period of time, following stopping of the compressor (11), and if the compressor (11) is activated immediately after the compressor protection period (fifth aspect).

Thus, if the compressor (11) cannot be activated, during the compressor protection period for protecting the compressor (11), even though the ON signal has been output from the control terminal (50) for a predetermined period of time, and a larger air conditioning capacity is being required, the target value is changed in the capacity-increasing direction when activating the compressor (11) immediately after the compressor protection period. Then, it is possible to compensate for the loss of air-conditioning which has occurred because the compressor (11) could not be activated.

It is preferred that the compressor (11) is configured so that the target value is changed in a capacity-decreasing direction if the compressor (11) has been stopped for a period of time longer than a compressor protection period in which an activation of the compressor (11) is prohibited over a certain period of time, following stopping of the compressor (11) (sixth aspect).

Thus, it is possible to avoid wasting energy by the compressor (11) by changing the target value in the capacity-decreasing direction when the compressor (11) has been stopped for a long time and a very large air conditioning capacity is not being required.

On the other hand, it is preferred that a target value of at least one of an indoor outlet air temperature, an evaporation temperature and a condensation temperature of an air conditioner (1) including the compressor (11), and a suction pressure and a discharge pressure of the compressor (11) is changed in a capacity-decreasing direction when entering an OFF state where the ON signal is not output (seventh aspect).

Thus, since a very large air conditioning capacity is not required even in the OFF state where the ON signal is not output from the control terminal (50), it is possible by changing the target value in the capacity-decreasing direction to avoid wasting energy by the compressor (11).

The operation controller (3) may control the compressor (11) using an inverter according to a switching frequency of a signal regarding ON/OFF to the compressor (11) output from the control terminal (50) of the air conditioner (1) (eighth aspect).

Thus, even with a configuration where only the ON signal to the compressor (11) is output from the control terminal (50), the compressor (11) can be controlled using an inverter based on the ON signal. That is, if the switching frequency of the signal regarding ON/OFF to the compressor (11) is a predetermined number of times or more, for example, it is estimated that the load required for air-conditioning the room is accordingly higher, and therefore such a control is performed as to increase the operation capacity of the compressor (11).

With a configuration where an ON signal is output, with which the load of the compressor (11) can be changed stepwise, it is possible to perform such a control using an inverter that the amount by which the capacity of the compressor (11) is increased can be changed according to the switching of the load, whereas when it has become a predetermined number of times or less after the load is switched to be lower, it is determined that the operation capacity of the compressor (11) can be decreased with no problems, and the operation capacity of the compressor (11) is decreased.

Therefore, by taking into consideration the switching frequency of the signal regarding ON/OFF to the compressor (11) as described above, it is possible to estimate the load required for the compressor (11), and it is therefore possible to control the compressor (11) using an inverter.

The operation controller (3) is configured so that a target value of at least one of an indoor outlet air temperature of an air conditioner (1) including the compressor (11), and a suction pressure and a discharge pressure of the compressor (11) is changed according to the switching frequency of the signal regarding ON/OFF, and the compressor (11) is controlled using an inverter based on the target value (ninth aspect).

Thus, where the operation of the air conditioner (1) is controlled based on the outlet air temperature or the suction pressure or the discharge pressure of the compressor (11), the target value is changed according to the switching frequency of the signal regarding ON/OFF output from the control terminal (50), and it is therefore possible to control the frequency of the compressor (11) according to the target value. Therefore, with the configuration described above, it is possible to realize the configuration of the eighth aspect described above.

Specifically, it is preferred that the target value is changed in a capacity-decreasing direction when the switching frequency of the signal regarding ON/OFF is a certain number of times or more within a desired period of time (tenth aspect).

Thus, when the switching frequency of the signal regarding ON/OFF is high, i.e., when a very large air conditioning capacity is not being required, it is possible to decrease the wasteful output of the compressor (11), thereby achieving an energy-conserving operation of the compressor (11), by changing the target value in the capacity-decreasing direction.

It is preferred that a compressor protection control for decreasing the target value so as not to go beyond a range over which the compressor (11) can be used is performed (eleventh aspect). Thus, even with a configuration where the compressor (11) is controlled using an inverter by changing the target value based on the ON signal output from the control terminal (50) as described above, it is possible to set the target value to such a value as not to go beyond the range over which the compressor (11) can be used, thereby protecting the compressor (11). Therefore, it is possible to more reliably prevent the compressor (11) from breaking down.

In such a configuration, the ON signal may be a signal related to modes of operation which are set for different loads of the compressor (11) (twelfth aspect). Thus, even with a configuration where the ON signal is not a signal for simply turning ON the compressor (11) but is a signal for activating modes of operation for different loads of the compressor (11), it is possible to estimate the load for air-conditioning the room based on the duration of the signal, the switching frequency of the signal regarding ON/OFF, etc., and it is therefore possible to control the compressor (11) using an inverter.

A thirteenth aspect is directed to an air conditioner including a refrigerant circuit (2) along which a plurality of heat exchangers (12, 21) and a compressor (11) are connected together for performing a refrigeration cycle by circulating a refrigerant through the refrigerant circuit (2). The air conditioner includes the operation controller (3) for the compressor (11) of one of claims 1-12.

With such a configuration, it is possible to obtain an air conditioner (1) having the advantages of the first to twelfth aspects.

In the configuration of the thirteenth aspect, the air conditioner (1) may be configured so that an ambient air is taken in, and heat is exchanged between the air and the refrigerant in the heat exchanger (21), after which the air is sent into a room (fourteenth aspect), or may be configured so that a heat source-side heat exchanger (121), among the heat exchangers, is configured so that a refrigerant flowing therein exchanges heat with a cooling water (fifteenth aspect).

By providing the operation controller (3) for the compressor (11) having such a configuration as those of the first to twelfth aspects with such an air conditioner (1, 101) as described above, it is possible to provide similar advantages to those of the first to twelfth aspects.

Advantages of the Invention

As described above, with the operation controller (3) for the compressor (11) of the present invention, the compressor (11) is controlled using an inverter based on the ON signal output from the control terminal (50). Therefore, even with a configuration where the indoor air temperature and the designated temperature are not output as a signal, it is possible to estimate the load required for air-conditioning the room by using the ON signal, and it is therefore possible to control the compressor (11) using an inverter. Therefore, with a configuration where only the ON signal is output, it is possible to improve the level of comfort and energy conservation as compared with the prior art.

According to the second aspect, the compressor (11) is controlled using an inverter according to either the duration of the ON signal or the duration of the OFF state where the ON signal is not output, and it is therefore possible to estimate the load required for air-conditioning the room based on the duration. Particularly, if the target value of at least one of the indoor outlet air temperature, and the suction pressure and the discharge pressure of the compressor (11) is changed according to either the duration of the ON signal or the duration of the OFF state where the ON signal is not output, as in the third aspect, it is possible to realize configurations of the first and second aspects and to provide similar advantages to those of the first and second aspects.

Specifically, according to the fourth aspect, the target value is changed in the capacity-increasing direction when the ON signal has been output continuously for a predetermined amount of time or more. Therefore, it is possible to increase the output of the compressor (11) according to the required air conditioning capacity, thereby quickly air-conditioning the room.

According to the fifth aspect, the target value is changed in the capacity-increasing direction if the ON signal has been output continuously for a predetermined period of time during the compressor protection period in which the activation of the compressor (11) is prohibited over a certain period of time, following stopping of the compressor (11), and if the compressor (11) is activated immediately after the compressor protection period. Therefore, it is possible to compensate for the loss due to the non-operation during the compressor protection period, thereby quickly air-conditioning the room.

According to the sixth aspect, the target value is changed in the capacity-decreasing direction if the compressor (11) has been stopped for a period of time longer than the compressor protection period, in which the activation of the compressor (11) is prohibited over a certain period of time, following the stopping of the compressor (11), thereby realizing an energy-conserving operation of the compressor (11). Moreover, by changing the target value in the capacity-decreasing direction when entering an OFF state where the ON signal is not output, as in the seventh aspect, it is possible to realize an energy-conserving operation of the compressor (11).

On the other hand, according to the eighth aspect, where the compressor (11) is controlled using an inverter according to the switching frequency of the signal regarding ON/OFF to the compressor (11) output from the control terminal (50). Therefore, it is possible to estimate the load required for air-conditioning the room based on the switching frequency of the signal regarding ON/OFF to the compressor (11). Particularly, by changing the target value of at least one of the indoor outlet air temperature, and the suction pressure and the discharge pressure of the compressor (11) according to the switching frequency of the signal regarding ON/OFF, as in the ninth aspect, it is possible to realize a configuration of the eighth aspect and to provide similar advantages to those of the eighth aspect.

Specifically, according to the tenth aspect, the target value is changed in the capacity-decreasing direction when the switching frequency of the signal regarding ON/OFF is a certain number of times or more within a desired period of time, thus realizing an energy-conserving operation of the compressor (11).

According to the eleventh aspect, which is based on the third, seventh or ninth aspect, the operation controller (3) is configured so that a compressor protection control for decreasing the target value so as not to go beyond a range over which the compressor (11) can be used is performed. Therefore, even when the compressor (11) is controlled using an inverter in a configuration where only the ON signal is output, it is possible to reliably prevent the compressor (11) from breaking down.

According to the twelfth aspect, the ON signal is a signal related to modes of operation which are set for different loads of the compressor (11). Therefore, even where the load of the compressor (11) can be changed stepwise in a configuration where only the signal related to ON/OFF of the compressor (11) is output, it is possible to improve the level of comfort and energy conservation by employing such a configuration as that of the first aspect.

An air conditioner according to the thirteenth aspect includes the operation controller (3) for the compressor (11) as set forth in one of the first to twelfth aspects, and it is therefore possible to realize an air conditioner having advantages of the first to twelfth aspects.

Moreover, according to the fourteenth and fifteenth aspects, even with an air conditioner (1) configured so that the air taken in is conditioned by a heat exchanger and is then sent into the room or with an air conditioner (101) including a heat source-side heat exchanger configured so that the refrigerant exchanges heat with the cooling water, it is possible to obtain similar advantages to those of the first to twelfth aspects by controlling the operation of the compressor (11) by using the operation controller (3) according to the first to twelfth aspects.

Figure 1:
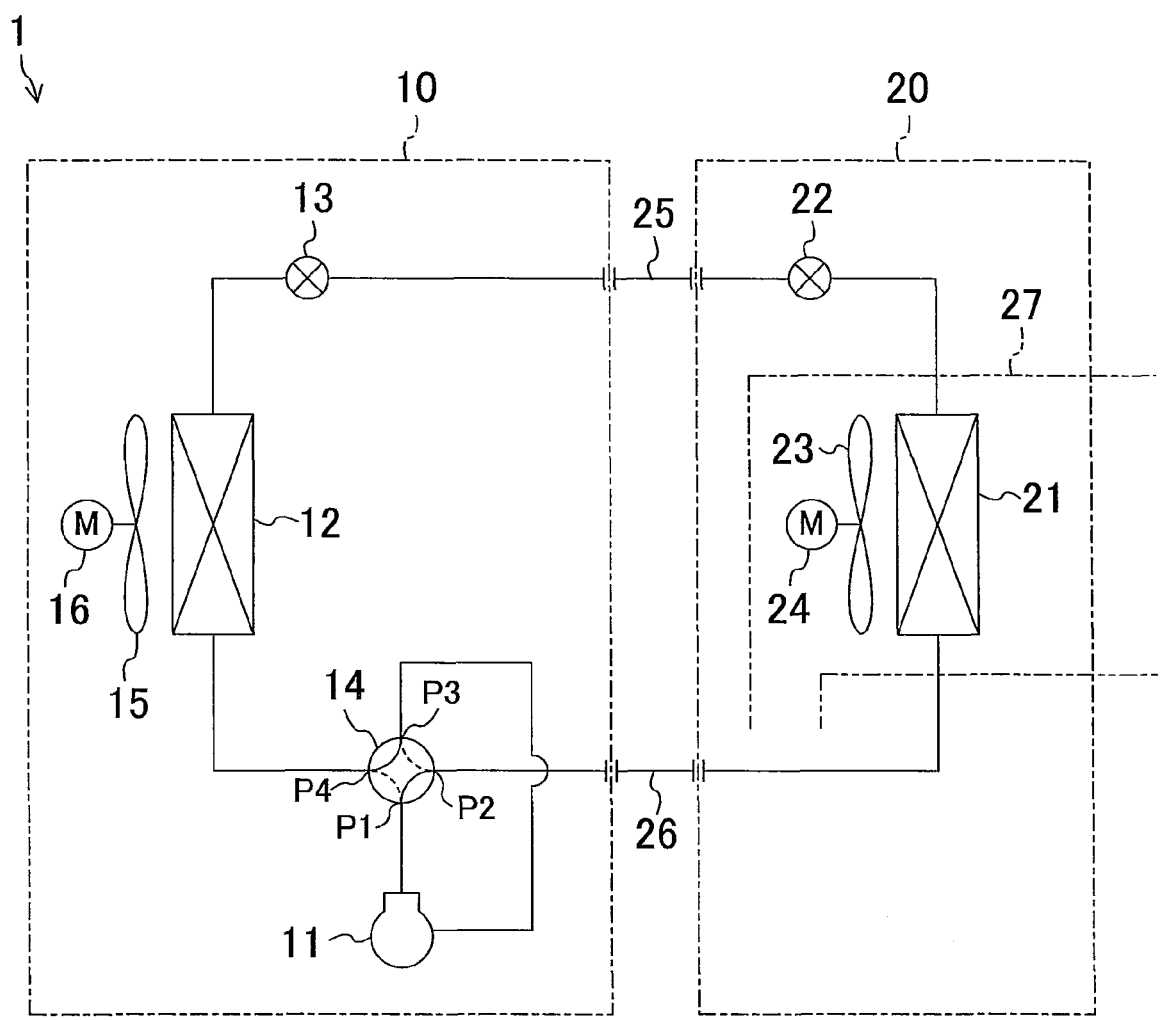
FIG. 1 is a piping diagram showing a configuration of an air conditioner according to Embodiment 1 of the present invention.

DESCRIPTION OF REFERENCE CHARACTERS 1, 101 Air conditioner
2, 102 Refrigerant circuit
3, 103 Operation controller
11, 111 Compressor
12 Outdoor heat exchanger (heat exchanger)
21 Indoor heat exchanger (heat exchanger)
30 Outdoor unit controller
31 Inverter control section
50, 150 Control interface (control terminal)
60, 160 Main controller
112 Utilization-side heat exchanger
121 Heat source-side heat exchanger

DESCRIPTION OF EMBODIMENTS

Embodiments of the present invention will now be described with reference to the drawings. Note that the following description of preferred embodiments is merely illustrative of the present invention, and is not intended to limit the present invention or the application and uses thereof.

Embodiment 1

The present embodiment is directed to an air conditioner (1) including an operation controller (3) for a compressor (11) of the present invention. The air conditioner (1) takes in the ambient air from outside and conditions the air, after which the air is sent into the room.

General Configuration of Air Conditioner

As shown in FIG. 1, the air conditioner (1) includes an outdoor unit (10) and an indoor unit (20). The outdoor unit (10) includes a compressor (11), an outdoor heat exchanger (12), an outdoor expansion valve (13), a four-way switching valve (14), and an outdoor fan (15). The indoor unit (20) includes an indoor heat exchanger (21), an indoor expansion valve (22) and an indoor fan (23).

In the outdoor unit (10), the discharge side of the compressor (11) is connected to a first port (P1) of the four-way switching valve (14). The suction side of the compressor (11) is connected to a third port (P3) of the four-way switching valve (14).

The outdoor heat exchanger (12) is a cross-fin-type fin-and-tube heat exchanger. One end of the outdoor heat exchanger (12) is connected to a fourth port (P4) of the four-way switching valve (14). The other end of the outdoor heat exchanger (12) is connected to the indoor heat exchanger (21) of the indoor unit (20) via a liquid-side connection pipe (25).

The outdoor fan (15) is rotated by a motor (16), and is provided near the outdoor heat exchanger (12). In the outdoor heat exchanger (12), heat is exchanged between the outside air sent by the outdoor fan (15) and the refrigerant flowing through the heat exchanger (12). The outdoor expansion valve (13) whose degree of opening is variable is provided between the outdoor heat exchanger (12) and the liquid-side connection pipe (25). A second port (P2) of the four-way switching valve (14) is connected to a gas-side connection pipe (26).

The four-way switching valve (14) can be switched between a first state (a state indicated by a solid line in FIG. 1) in which the first port (P1) and the second port (P2) are connected together and the third port (P3) and the fourth port (P4) are connected together, and a second state (a state indicated by a broken line in FIG. 1) in which the first port (P1) and the fourth port (P4) are connected together and the second port (P2) and the third port (P3) are connected together.

In the indoor unit (20), the indoor heat exchanger (21) is a cross-fin-type fin-and-tube heat exchanger, as is the outdoor heat exchanger (12). On end of the indoor heat exchanger (21) is connected to the second port (P2) of the four-way switching valve (14) via the gas-side connection pipe (26). The other end of the indoor heat exchanger (21) is connected to the liquid-side connection pipe (25).

The indoor fan (23) is rotated by a motor (24), and is provided near the indoor heat exchanger (21). In the indoor heat exchanger (21), heat is exchanged between the air guided by the indoor fan (23) and the refrigerant flowing through the heat exchanger (21). The indoor expansion valve (22) whose degree of opening is variable is provided between the indoor heat exchanger (21) and the liquid-side connection pipe (25). Note that in this embodiment, an introduction duct (27) connecting together the room and the outside includes the indoor heat exchanger (21) and the indoor fan (23) for supplying the air into the room which is obtained by taking in and conditioning the ambient air. The introduction duct (27) also includes a damper (not shown) for adjusting the air flow through the introduction duct (27).

The air conditioner (10) having such a configuration performs the heating operation when the four-way switching valve (14) is in the first state, and the cooling operation when the four-way switching valve (14) is in the second state. In the heating operation, a refrigerant circuit (2) performs a vapor-compression refrigeration cycle in which the outdoor heat exchanger (12) functions as an evaporator and the indoor heat exchanger (21) as a condenser. On the other hand, in the cooling operation, the refrigerant circuit (2) performs a vapor-compression refrigeration cycle in which the outdoor heat exchanger (12) functions as a condenser and the indoor heat exchanger (21) as an evaporator.

Control of Each Unit

Figure 2:
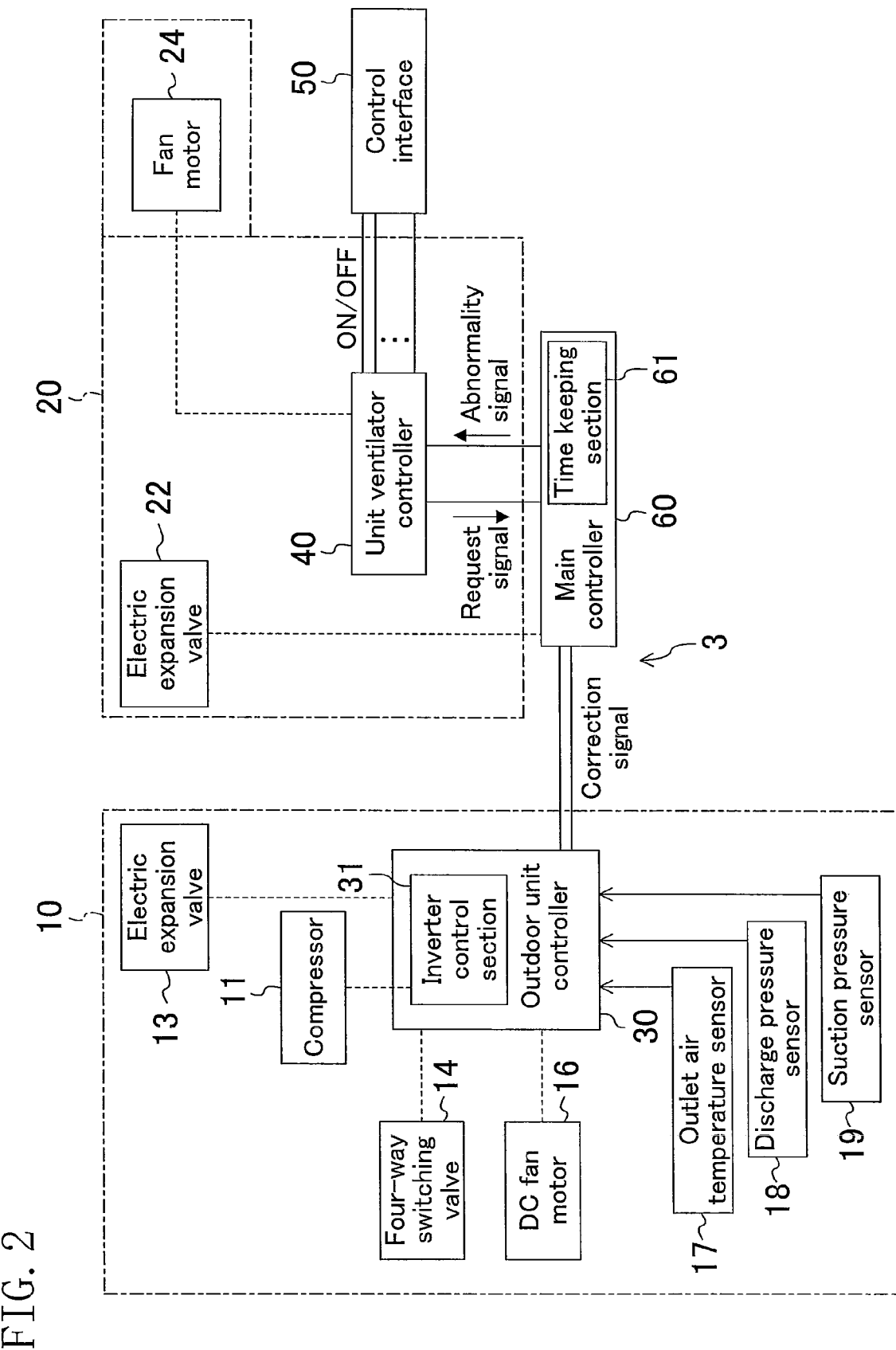
FIG. 2 is a block diagram showing the control block of the air conditioner.

Next, how each unit is controlled will be described below with reference to a control block diagram of the outdoor unit (10) and the indoor unit (20) shown in FIG. 2.

The outdoor unit (10) includes an outdoor unit controller (30) for controlling the compressor (11), the four-way switching valve (14), an electric expansion valve (13) as the outdoor expansion valve, and the motor (16) for the outdoor fan (15), etc. The outdoor unit controller (30) is configured so that signals can be exchanged between the outdoor unit controller (30) and a main controller (60) to be described below.

The outdoor unit controller (30) includes an inverter control section (31). The inverter control section (31) for controlling the compressor (11) using an inverter sets at least one of the target values of the indoor outlet air temperature, the discharge pressure and the suction pressure of the compressor (11), and controls the frequency of the compressor (11) based on the at least one target value. Note that the outlet air temperature is measured by an outlet air temperature sensor (17), which is provided around the outlet port of the indoor unit (20), and is sent to the outdoor unit controller (30) as a signal. The discharge pressure and the suction pressure are measured by a discharge pressure sensor (18) and a suction pressure sensor (19), respectively, and are sent to the outdoor unit controller (30) as signals. Note that while the discharge pressure and the suction pressure are measured by the discharge pressure sensor (18) and the suction pressure sensor (19) in this embodiment, the present invention is not limited to this, and the discharge pressure and the suction pressure may be calculated in the outdoor unit controller (30) based on the discharge temperature and the suction temperature measured by a discharge temperature sensor and a suction temperature sensor, respectively.

The indoor unit (20) includes a unit ventilator controller (40) for controlling the motor (24) for the indoor fan (23), etc. The unit ventilator controller (40) is connected to a control interface (50) (the control terminal) as a so-called "thermostat" installed in the room so that signals can be exchanged therebetween. The unit ventilator controller (40) is also connected to the main controller (60) to be described below so that signals can be exchanged therebetween. Note that the unit ventilator controller (40) and the main controller (60) may be hard-wired together or connected together by wireless communication so that signals can be exchanged therebetween.

The unit ventilator controller (40) outputs a request signal (e.g., an ON signal) to the main controller (60) based on a signal related to ON/OFF of the compressor transmitted from the control interface (50) (e.g., an ON signal, ON signals of different stages for different loads, etc.). When an abnormality signal is received from the main controller (60), the unit ventilator controller (40) transmits the signal to the control interface (50) so that it is displayed on the control interface (50) or a warning sound may be output.

The control interface (50) allows one to turn ON/OFF the air conditioner (1) as a whole, and in this embodiment allows one to switch the load of air conditioning (compressor) between two levels (1st stage: partial load, 2nd stage: full load), for example. That is, the control interface (50) can output a 1st stage ON signal and a 2nd stage ON signal based on the switching operation by the operator.

The main controller (60) exchanges signals between the outdoor unit (10) and the indoor unit (20), and controls an electric expansion valve (22) as the indoor expansion valve of the indoor unit (20). Specifically, the main controller (60) is connected not only to the unit ventilator controller (40) but also to the outdoor unit controller (30) so that signals can be exchanged therebetween. Note that the connection between the main controller (60) and the outdoor unit controller (30) may also be either hard wire or wireless communication such that signals can be exchanged therebetween, as with the connection between the unit ventilator controller (40) and the main controller (60).

The main controller (60) also includes a time keeping section (61) for measuring the duration of the request signal received from the unit ventilator controller (40). As will be later described in detail, when the time keeping section (61) measures to indicate that the amount of time over which a request signal has been received or not received has exceeded a predetermined amount of time, the main controller (60) outputs a correction signal for correcting the capacity of the compressor (11) depending on the type of the signal and the amount of time. The correction signal is a signal for correcting the target values of the outlet air temperature and the discharge pressure and the suction pressure of the compressor (11) set by the inverter control section (31). By outputting such a correction signal to the inverter control section (31), it is possible to control the capacity of the compressor (11) using an inverter based on the ON/OFF-related signal output from the control interface (50).

The main controller (60) and the inverter control section (31) together form the operation controller (3) for the compressor (11) of the present invention.

Correction of Compressor Target Values

As described above, a target value of the compressor (11) set by the outdoor unit controller (30) is based on a predetermined target value, and is corrected according to the correction signal from the main controller (60), wherein the compressor (11) is controlled using an inverter based on the corrected target value. The correction of the target value will now be described in detail based on the flow shown in FIG. 3 and the timing diagram shown in FIG. 4.

Figure 3:
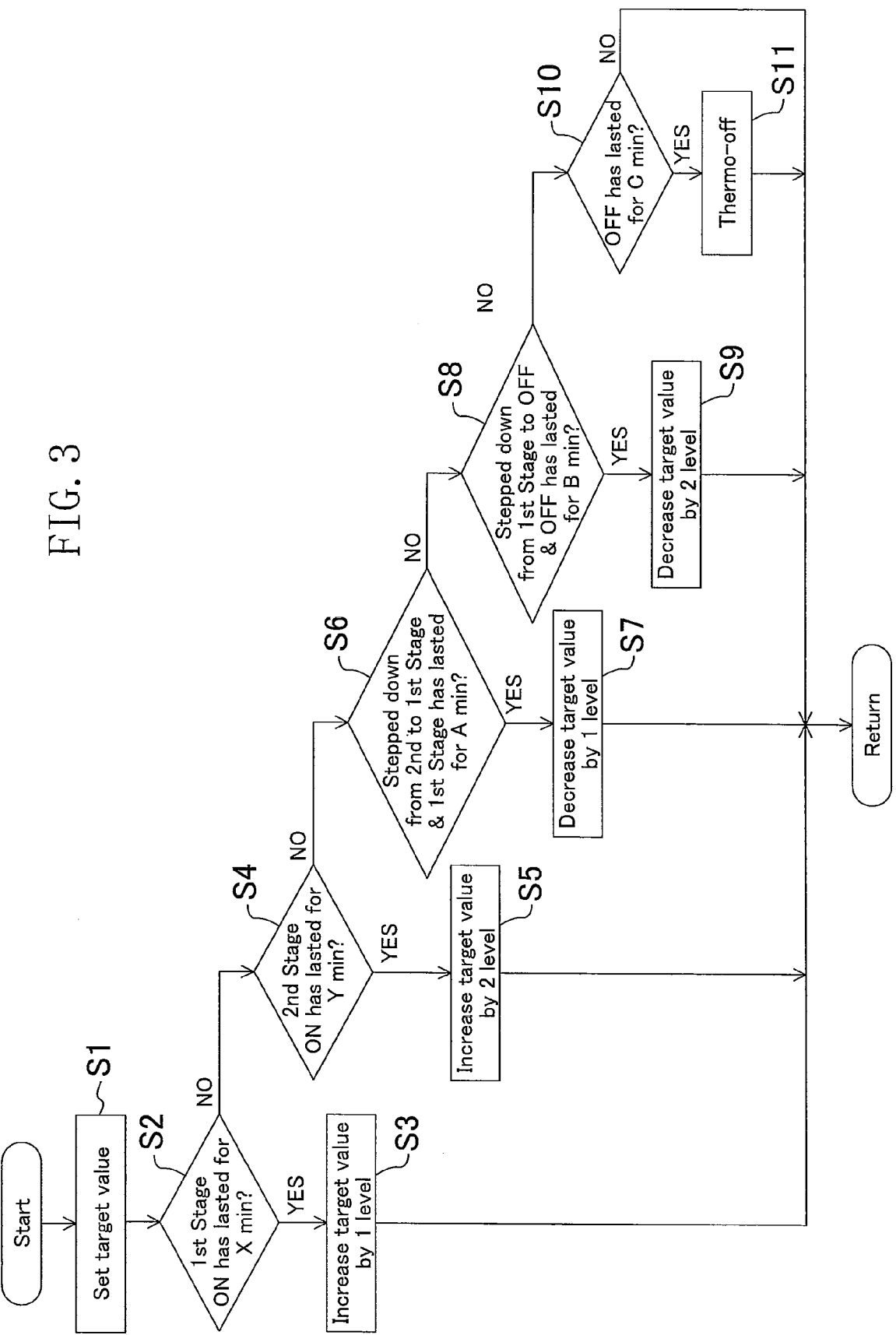
FIG. 3 is a flow diagram showing an example of how a correction signal for correcting a target value is produced based on an ON signal.

After the start of the flow shown in FIG. 3, first in step S1, the outdoor unit controller (30) sets a target value of the outlet air temperature or the discharge pressure or the suction pressure of the compressor (11) based on one of the output values of the outlet air temperature sensor (17), the discharge pressure sensor (18) and the suction pressure sensor (19). The outdoor unit controller (30) controls the compressor (11) using an inverter based on the target value.

Then, in step S2, it is determined whether the output signal from the control interface (50) is the 1st stage ON signal for partial load and the corresponding request signal has been received by the main controller (60) continuously for X minutes or more. If it is determined to be the case (YES), the target value is increased by 1 level in step S3 to follow, and the process exits the flow to return to the start (Return).

On the other hand, if it is determined in step S2 not to be the case (NO), it is determined in step S4 whether the 2nd stage ON signal for full load has been received as the request signal by the main controller (60) continuously for Y minutes or more.

If it is determined in step S4 that the 2nd stage ON signal has been received as the request signal for Y minutes or more (YES), the target value is increased by 2 levels in step S5, and then the process exits the flow to return to the start (Return).

On the other hand, if it is determined in step S4 that the ON signal has not been received as the request signal for Y minutes or more (NO), it is determined in step S6 whether the request signal input to the main controller (60) has changed from the 2nd stage ON signal to the 1st stage ON signal, after which the request signal corresponding to the 1st stage ON signal has lasted for A minutes or more.

If it is determined in step S6 that the signal has changed from 2nd stage to 1st stage and that the 1st stage ON signal has lasted for A minutes or more (YES), the target value is decreased by 1 level in step S7 to follow, and then the process exits the flow to return to the start (Return).

On the other hand, if it is determined in step S6 that the signal has not changed from 2nd stage to 1st stage or that the 1st stage ON signal has not lasted for A minutes or more (NO), the process proceeds to step S8, where it is determined whether it has been B minutes or more since the request signal input to the main controller (60) changed from the 1st stage ON signal to OFF. If it is determined that it has been B minutes or more since the request signal has changed to OFF (YES), the target value is decreased by 2 levels in step S9 to follow, and then the process exits the flow to return to the start (Return). If it is determined in step S8 that the request signal has not changed from 1st stage ON to OFF or that OFF has not lasted for B minutes or more (NO), it is determined in step S10 whether OFF has lasted for C minutes or more.

If it is determined in step S10 that the signal OFF state has lasted for C minutes or more (YES), the compressor (11) is stopped in step S11. On the other hand, if it is determined in step S10 that the signal OFF state has not lasted for C minutes or more (NO), the process directly exits the flow to return to the start (Return).

Note that the number of levels by which the target value is corrected in step S3, S5, S7 or S9 is not limited to 1 level or 2 levels as described above, but may be any other number of levels as long as the specific number of levels, which may vary depending on the size of the room space, the operation conditions, etc., is of such a correction level that a comfortable indoor air temperature can be achieved.

Figure 4:
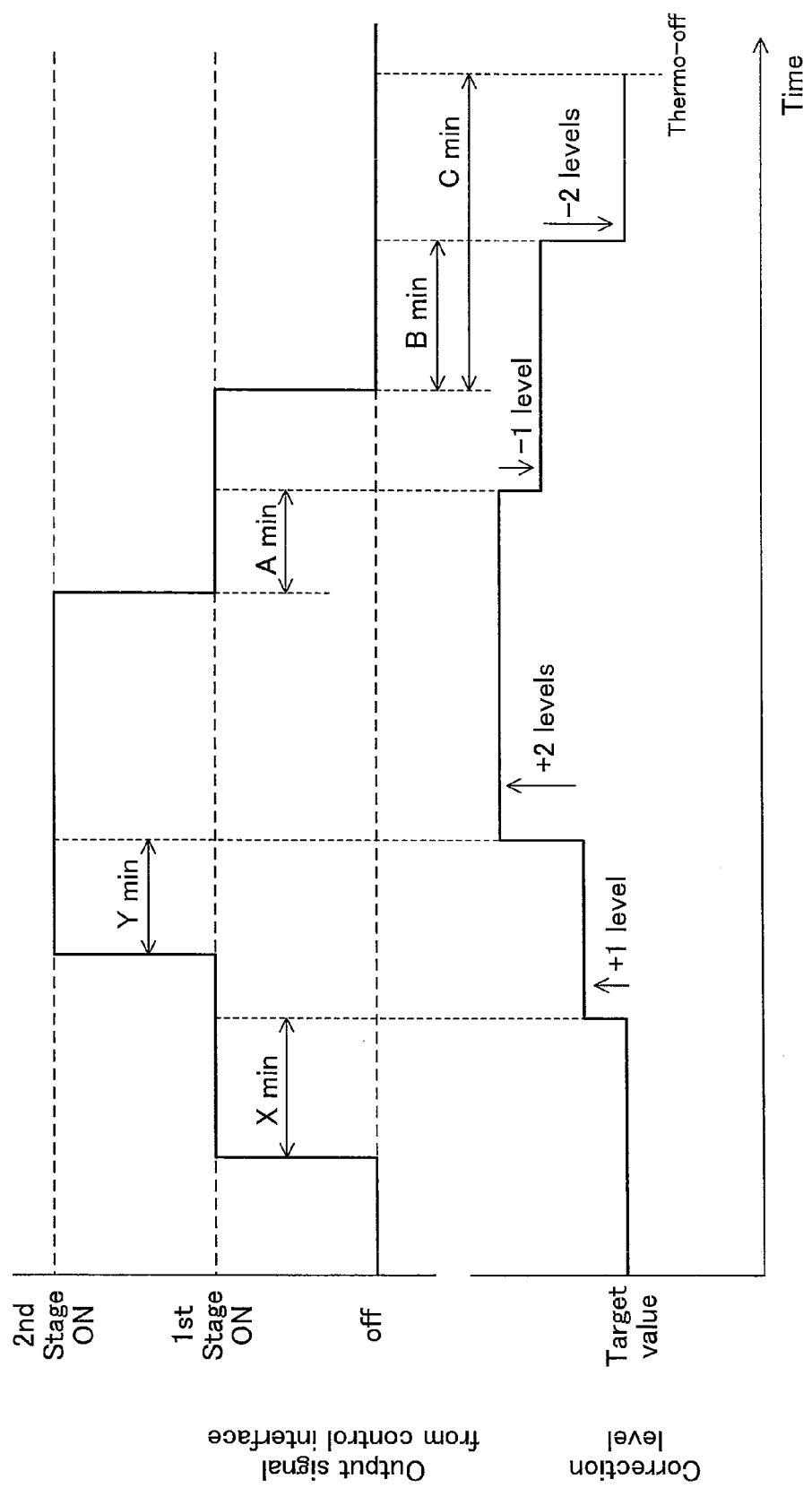
FIG. 4 is a timing diagram showing an example of the relationship between the ON signal and the correction level.

FIG. 4 shows an example of a timing diagram of a target value correction signal output from the main controller (60) based on such a flow as described above.

When such a signal as shown in the upper half of FIG. 4 is output from the control interface (50), the target value is corrected based on the flow shown in FIG. 3. In this case, the main controller (60) obtains, based on the flow of FIG. 3, how much the target value should be corrected (see the lower half of FIG. 4 for the correction level), and outputs the correction signal to the outdoor unit controller (30).

Specifically, a correction signal for increasing the target value by 1 level is output if the 1st stage ON signal output from the control interface (50) has lasted for X minutes or more, and a correction signal for increasing the target value by 2 levels is output if the 2nd stage ON signal output from the control interface (50) has lasted for Y minutes or more. Thus, when the partial load state or the full load state of the compressor (11) has lasted long, it is determined that a large load is required for air-conditioning the room, and the target value is increased, so that the room can be air-conditioned quickly and reliably. Particularly, when the 2nd stage ON signal for full load has been output for a long time, it is estimated that a high load is required, and therefore the target value is increased by an accordingly larger amount, so that the room can be air-conditioned quickly and reliably.

On the other hand, a correction signal for decreasing the target value by 1 level is output if the signal output from the control interface (50) has been changed from the 2nd stage ON signal to the 1st stage ON signal and if the 1st stage ON signal has been input continuously for A minutes or more, and a correction signal for decreasing the target value by 2 levels is output if the 1st stage ON signal output from the control interface (50) has been turned OFF and if the OFF state has continued for B minutes or more. A thermo-off state is achieved (the compressor is stopped) if the signal input to the main controller (60) has been OFF continuously for C minutes or more. Thus, by decreasing the target value when the air-conditioning load has decreased, it is possible to quickly decrease the load on the compressor for energy conservation.

Compressor Protection Control

While the target value of the outlet air temperature, the discharge pressure or the suction pressure is corrected according to the output signal from the control interface (50) as described above, the inverter control section (31) is configured so as to perform a protection control to protect the compressor (11) as follows.

—Discharge Pipe Temperature Protection Control—

When the temperature detected by the temperature sensor attached to the discharge pipe (not shown) of the compressor (11) seems likely to go beyond the temperature range over which the compressor (11) can be used, the target value is decreased to decrease the operation frequency of the compressor (11), thus protecting the compressor (11).

—High Pressure Protection Control—

When the pressure detected by the discharge pressure sensor (18) attached to the discharge pipe (not shown) of the compressor (11) or the equivalent saturation pressure calculated from the temperature detected by the temperature sensor (not shown) attached to the condenser seems likely to go beyond the range over which the compressor (11) can be used, the target value is decreased to decrease the operation frequency of the compressor (11), thus protecting the compressor (11).

—Inverter Temperature/Current Value Protection Control—

When the temperature and the current value detected by the temperature sensor (not shown) and the current sensor (not shown), respectively, attached in the substrate of the inverter control section (31) seem likely to go beyond the range over which the substrate can be used, the target value is decreased to decrease the operation frequency of the compressor (11), thus protecting the compressor (11).

—Low Pressure Difference Protection Control—

When the pressure difference, which is obtained from the pressure detected by the discharge pressure sensor (18) attached to the discharge pipe (not shown) of the compressor (11) or the equivalent saturation pressure calculated from the temperature detected by the temperature sensor (not shown) attached to the condenser and the pressure detected by the suction pressure sensor (19) attached to the suction pipe of the compressor (11) or the equivalent saturation pressure calculated from the temperature detected by the temperature sensor (not shown) attached to the evaporator, seems likely to go beyond the range over which the compressor (11) can be used, the rotation speed of the fan of the condenser is decreased or the target value is decreased to decrease the operation frequency of the compressor (11), thus protecting the compressor (11).

—High Compression Ratio Protection Control—

When the compression ratio, which is obtained from the pressure detected by the discharge pressure sensor (18) attached to the discharge pipe (not shown) of the compressor

(11) or the equivalent saturation pressure calculated from the temperature detected by the temperature sensor (not shown) attached to the condenser and the pressure detected by the suction pressure sensor (19) attached to the suction pipe (not shown) of the compressor (11) or the equivalent saturation pressure calculated from the temperature detected by the temperature sensor (not shown) attached to the evaporator, seems likely to go beyond the range over which the compressor (11) can be used, the target value is decreased to decrease the operation frequency of the compressor (11), thus protecting the compressor (11).

—Advantage of Embodiment 1—

In this embodiment having such a configuration, a correction signal for correcting the target value, which is set by the inverter control section (31) in the outdoor unit controller (30), is produced by the main controller (60) based on the ON/OFF switching signal (the ON signal) output from the control interface (50), and the correction signal is output to the inverter control section (31). Therefore, even when information such as the indoor air temperature, the designated temperature, etc., are not available, it is possible to estimate the difference between the indoor air temperature and the designated temperature, i.e., the load required for air-conditioning the room, based on the ON/OFF signal for the compressor (11) output from the control interface (50), and it is therefore possible to control the compressor (11) using an inverter so as to achieve a more comfortable air temperature in the room. Thus, it is possible to improve the level of comfort and energy conservation.

Where the control interface (50) can output either one of two types (1st stage and 2nd stage) of ON signals for partial load and for full load, the level of the target value is increased if the duration of the signal is longer than a predetermined amount of time, whereas the level of the target value is decreased if the ON signal has been switched to another so as to decrease the load and if a predetermined amount of time has elapsed in that state. Therefore, it is possible to quickly and reliably change the load of the compressor (11) according to the load of the room. Thus, it is possible to quickly achieve a comfortable indoor air temperature and to quickly decrease the wasteful capacity of the compressor (11), thereby more reliably improving the level of comfort and energy conservation.

Particularly, where the control interface (50) can output two types of ON signals as described above, if the 2nd stage ON signal for full load has been output continuously for a predetermined amount of time or more, it is estimated that the required load of air-conditioning is high, and therefore the target value can be more increased so as to quickly achieve a comfortable indoor air temperature. On the other hand, with such a configuration, after a predetermined amount of time has elapsed since the switching to OFF, it is estimated that the required load has decreased substantially, and therefore the target value can be more decreased so as to quickly decrease the capacity of the compressor (11) for energy conservation.

Moreover, while the target value is set/corrected as described above, if the detection value of the temperature of the discharge pipe of the compressor (11), the discharge pressure, the suction pressure, or the like, seems likely to go beyond the range over which the compressor (11) can be used, the target value can be decreased so as to decrease the operation frequency of the compressor (11), thus protecting the compressor (11).

Embodiment 2

Figure 5:
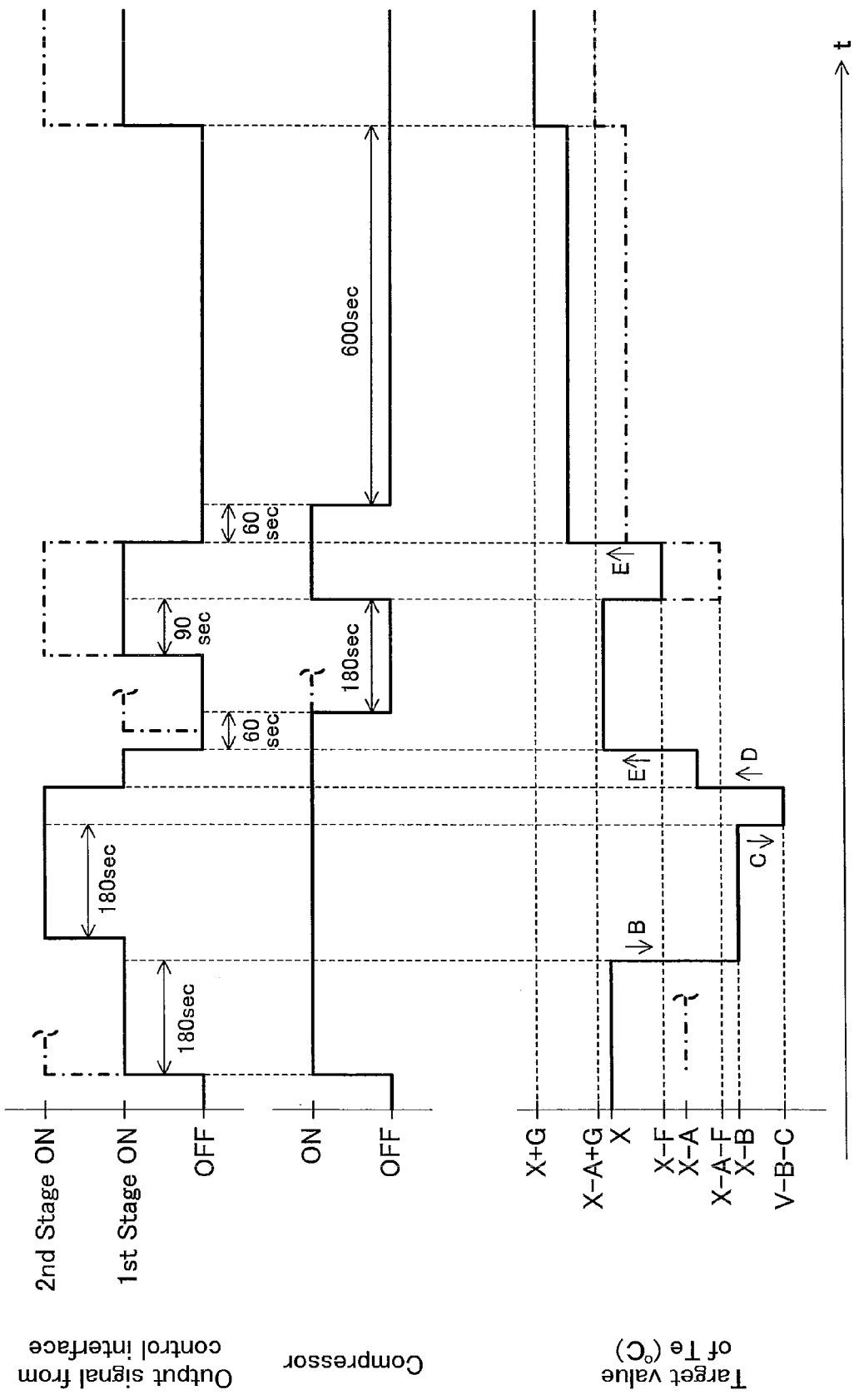
FIG. 5 is a timing diagram showing an example of a case where the target value is corrected based on the ON signal during a cooling operation in an air conditioner according to Embodiment 2.
Figure 6:
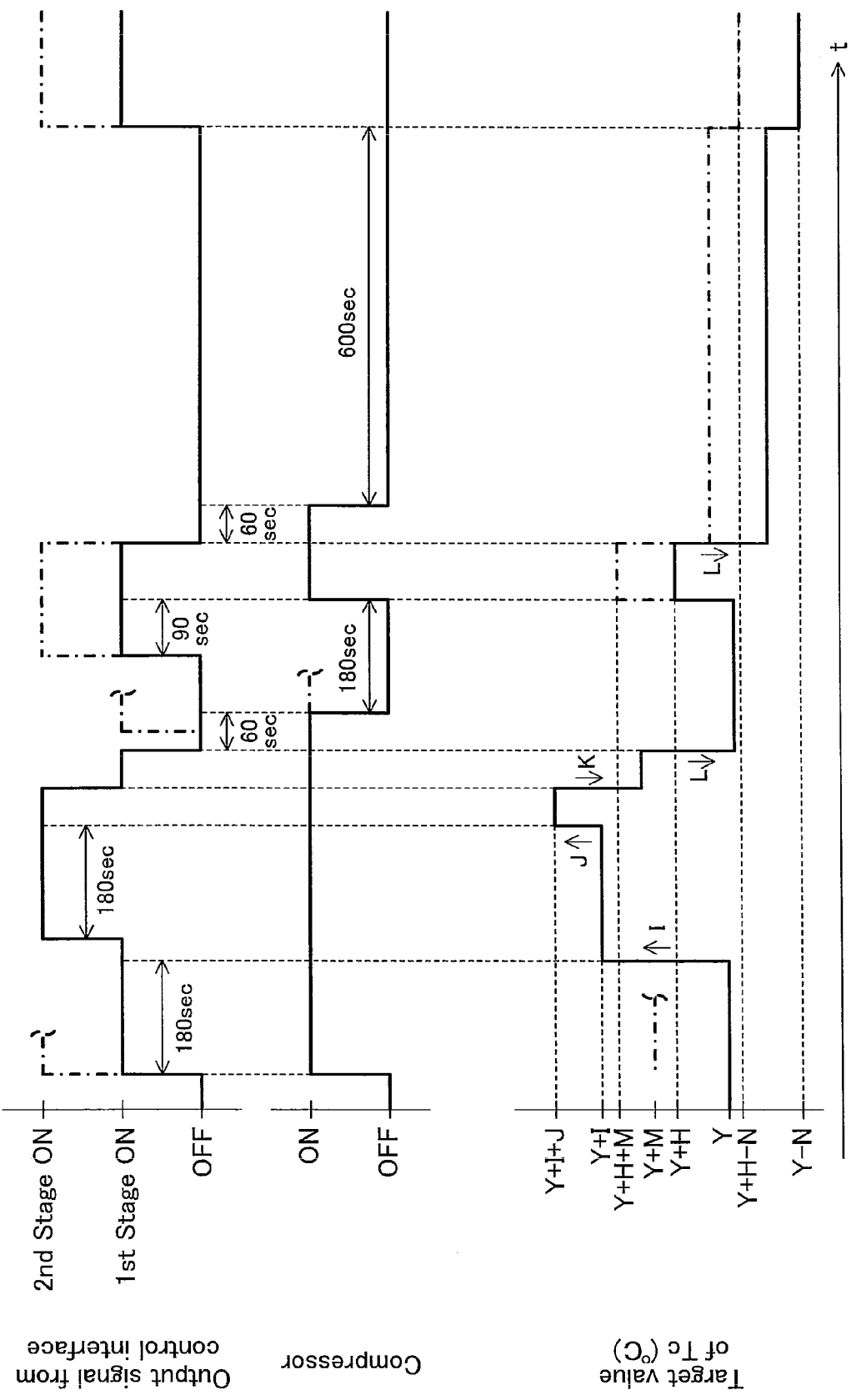
FIG. 6 is a diagram corresponding to FIG. 5 during a heating operation.

FIGS. 5 and 6 each show a timing diagram for a target value correction control for the compressor (11) of the air conditioner (1) according to Embodiment 2 of the present invention. Note that the controllers (30, 40) of the outdoor unit (10) and the indoor unit (20), the control interface (50), the main controller (60), etc., are similar to those of Embodiment 1, and only part of the target value correction control is different from that of Embodiment 1. Therefore, the different part will be described below.

—Cooling Operation—

The target value correction control by the main controller (60) when the air conditioner (1) is in a cooling operation will be described below with reference to FIG. 5.

First, when the 1st stage or the 2nd stage ON signal is output from the control interface (50), the compressor (11) is started (turned ON). In this process, the target value of the evaporation temperature (Te) is set to be $X°$ C. when the 1st stage ON signal is output, and the target value of the evaporation temperature (Te) is set to be $(X-A)°$ C. (indicated by a one-dot chain line in the figure) when the 2nd stage ON signal is output. Thus, when the 2nd stage ON signal is output, a higher cooling capacity is being required than when the 1st stage ON signal is output, and therefore a lower evaporation temperature target value is set. Note that the evaporation temperature (Te) is calculated based on the output signal from the suction pressure sensor (19).

If the 1st stage ON signal has been output from the control interface (50) for 180 seconds or more, the target value of the evaporation temperature (Te) is decreased by $B°$ C. to be $(X-B)°$ C. This is for improving the cooling capacity to more quickly bring the indoor air temperature to the target temperature since the ON signal has been output for a relatively long period of time.

If the 2nd stage ON signal has been output from the control interface (50) for 180 seconds or more, the target value of the evaporation temperature (Te) is corrected to be decreased by $C°$ C.

Then, simultaneously with the 2nd stage ON signal going OFF, the target value of the evaporation temperature (Te) is increased by $D°$ C., and simultaneously with the 1st stage ON signal going OFF, the target value of the evaporation temperature (Te) is corrected to be increased by $E°$ C. Thus, since the load is small when the ON signal of either stage goes OFF, the target value of the evaporation temperature (Te) is then set to be accordingly higher, thereby achieving an energy-conserving operation of the compressor (11).

If the 1st stage ON signal has been OFF continuously for 60 seconds, the compressor (11) is stopped (turned OFF), whereas if the 1st stage ON signal is output from the control interface (50) within 60 seconds of the 1st stage ON signal going OFF, the compressor (11) is not stopped but is kept operating (indicated by a one-dot chain line in the figure).

Note that although not shown in the figure, if ON signals of different stages are output from the control interface (50) and turned OFF repeatedly a predetermined number of times (e.g., twice) or more during the 60-second period, a very large cooling capacity is not being required, and therefore the target value of the evaporation temperature (Te) is corrected to be increased. Note that the 60-second period corresponds to the desired period of time of the present invention.

If the 1st stage ON signal has been output from the control interface (50) continuously for 90 seconds or more while the re-activation of the compressor (11) is prohibited for the protection of the compressor (11) over a predetermined amount of time (the compressor protection period, which is 180 seconds in the present embodiment) since the stopping of the compressor (11), and if the compressor (11) is activated based on the ON signal after the elapse of the predetermined amount of time, the target value of the evaporation temperature (Te) is corrected to $(X-F)°$ C. This is for compensating, after the activation of the compressor (11), for the loss which has occurred because the compressor (11) could not be activated for the protection thereof even though there was an output request from the control interface (50). Note that in the case described above, if the signal output from the control interface (50) is not the 1st stage ON signal but is the 2nd stage ON signal, the target value of the evaporation temperature (Te) is corrected to (X−A−F)° C. (indicated by a one-dot chain line in the figure).

Where 600 seconds or more have elapsed since the stopping of the compressor (11) until it is activated next, the evaporation temperature (Te) is corrected to (X+G)° C. if the 1st stage ON signal is output from the control interface (50), whereas the evaporation temperature (Te) is corrected to (X−A+G)° C. if the 2nd stage ON signal is output. Such a correction control is performed because it is believed that a very large capacity is not being required since the compressor (11) has been stopped for a long time. In the present embodiment, the correction described above is performed if 600 seconds or more have elapsed since the stopping of the compressor (11) until it is activated next. However, the present invention is not limited thereto, and it may be any period as long as it is longer than the compressor protection period of the compressor (11).

—Heating Operation—

Next, a target value correction control by the main controller (60) when the air conditioner (1) is in a heating operation will now be described with reference to FIG. 6.

First, when the 1st stage or 2nd stage ON signal is output from the control interface (50), the compressor (11) is activated (turned ON), as in the case of a cooling operation. Then, the target value of the condensation temperature (Tc) is set to be Y° C. if the 1st stage ON signal is output, whereas the target value of the condensation temperature (Tc) is set to be (Y+H)° C. (indicated by a one-dot chain line in the figure) if the 2nd stage ON signal is output. Thus, when the 2nd stage ON signal is output, a higher heating capacity is being required as compared with when the 1st stage ON signal is output, and therefore the target value of the condensation temperature (Tc) is set to be higher. Note that the condensation temperature (Tc) is calculated based on the output signal from the discharge pressure sensor (18).

If the 1st stage ON signal is output from the control interface (50) for 180 seconds or more, the target value of the condensation temperature (Tc) is increased by I° C. to be (Y+I)° C. This is for improving the heating capacity to more quickly bring the indoor air temperature to the target temperature since the ON signal has been output for a relatively long period of time.

Also when the 2nd stage ON signal has been output from the control interface (50) for 180 seconds or more, the target value of the condensation temperature (Tc) is corrected to be increased by J° C.

Then, the target value of the condensation temperature (Tc) is also decreased by K° C. simultaneously with the 2nd stage ON signal going OFF, and the target value of the condensation temperature (Tc) is corrected to be decreased by L° C. simultaneously with the 1st stage ON signal going OFF. Since it is believed that the load is small when the ON signal of either stage goes OFF, the target value of the condensation temperature (Tc) is then set to be lower, thereby achieving an energy-conserving operation of the compressor (11).

If the 1st stage ON signal has been OFF continuously for 60 seconds, the compressor (11) is stopped (turned OFF), whereas if the 1st stage ON signal is output from the control interface (50) within 60 seconds of the 1st stage ON signal going OFF, the compressor (11) is not stopped but is kept operating (indicated by a one-dot chain line in the figure).

Note that although not shown in the figure, if ON signals of different stages are output from the control interface (50) and turned OFF repeatedly a predetermined number of times (e.g., twice) or more during the 60-second period, a very large heating capacity is not being required, and therefore the target value of the condensation temperature (Tc) is corrected to be decreased. Note that the 60-second period corresponds to the desired period of time of the present invention.

If the 1st stage ON signal has been output from the control interface (50) continuously for 90 seconds or more while the re-activation of the compressor (11) is prohibited for the protection of the compressor (11) over a predetermined amount of time (the compressor protection period, which is 180 seconds in the present embodiment) since the stopping of the compressor (11), and if the compressor (11) is activated based on the ON signal after the elapse of the predetermined amount of time, the target value of the condensation temperature (Tc) is corrected to (Y+M)° C. This is for compensating, after the activation of the compressor (11), for the loss which has occurred because the compressor (11) could not be activated for the protection thereof even though there was an output request from the control interface (50). Note that in the case described above, if the signal output from the control interface (50) is not the 1st stage ON signal but is the 2nd stage ON signal, the target value of the condensation temperature (Tc) is corrected to (Y+H+M)° C.

Where 600 seconds or more have elapsed since the stopping of the compressor (11) until it is activated next, the evaporation temperature (Te) is corrected to (Y−N)° C. if the 1st stage ON signal is output from the control interface (50), whereas the evaporation temperature (Te) is corrected to (Y+H−N)° C. if the 2nd stage ON signal is output. Such a correction control is performed because it is believed that a very large capacity is not being required since the compressor (11) has been stopped for a long time. In the present embodiment, the correction described above is performed if 600 seconds or more have elapsed since the stopping of the compressor (11) until it is activated next. However, the present invention is not limited thereto, and it may be any period as long as it is longer than the compressor protection period of the compressor (11).

Note that the values A-N used in the target value correction control are not limited to those that satisfy the relationships shown in FIGS. 5 and 6, but may be set on site according to the capacity of the compressor (11) or the air conditioner (1), etc.

—Advantage of Embodiment 2—

In this embodiment having such a configuration, the target value of the evaporation temperature (Te) or the condensation temperature (Tc) of the compressor (11) is corrected in the capacity-increasing direction if the ON signal of either stage has been output from the control interface (50) for a predetermined amount of time or more. Therefore, in situations where a larger cooling capacity or heating capacity is required, the compressor (11) can be operated with an appropriate capacity.

When the ON signal output from the control interface (50) goes OFF, the target value is corrected in the capacity-decreasing direction so as to conserve the output of the compressor (11) in situations where the load is not very large.

When the ON signal has been output from the control interface (50) and turned OFF repeatedly a predetermined number of times or more within a desired period of time, the target value is corrected in the capacity-decreasing direction so as to conserve the output of the compressor (11) in situations where a very large capacity is not being required.

If the ON signal of either stage has been output from the control interface (50) continuously for a predetermined period of time during the compressor protection period in which the activation of the compressor (11) is prohibited for the protection of the compressor (11) over a predetermined amount of time, following the stopping of the compressor (11), and if the compressor (11) is activated immediately after the compressor protection period, the target value is corrected in the capacity-increasing direction. Then, it is possible to compensate for the loss of capacity which has occurred because the compressor (11) could not be activated for the compressor protection period, thereby preventing, as much as possible, the lowering of the air conditioning capacity due to the compressor protection period.

Moreover, if the ON signal of either stage is output from the control interface (50) while the compressor (11) has been stopped for a period of time longer than the compressor protection period, the target value is corrected in the capacity-decreasing direction so as to conserve the output of the compressor (11) in situations where the load is not very large.

Embodiment 3

Figure 7:
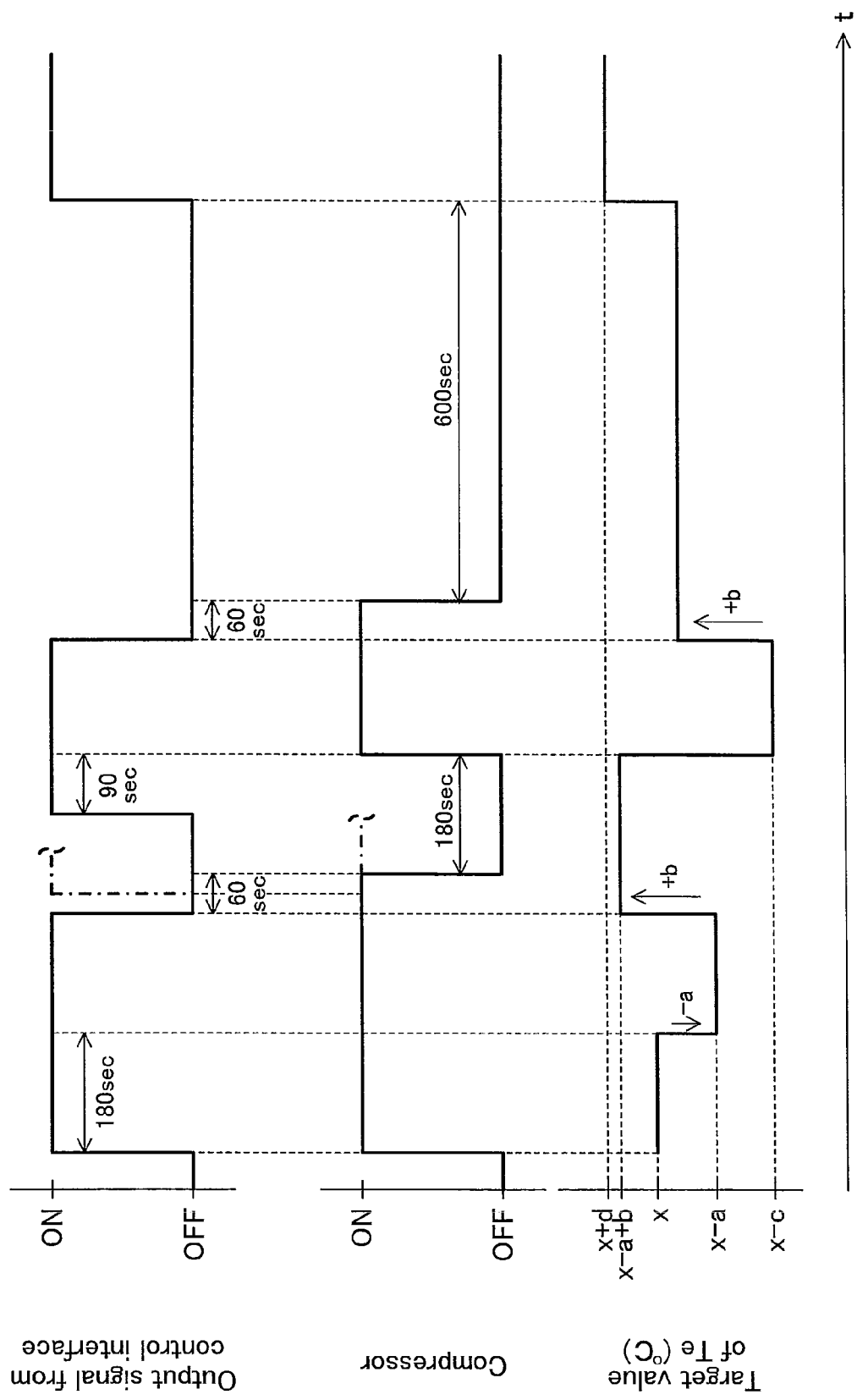
FIG. 7 is a timing diagram showing an example of a case where the target value is corrected based on the ON signal during a cooling operation in an air conditioner according to Embodiment 3.
Figure 8:
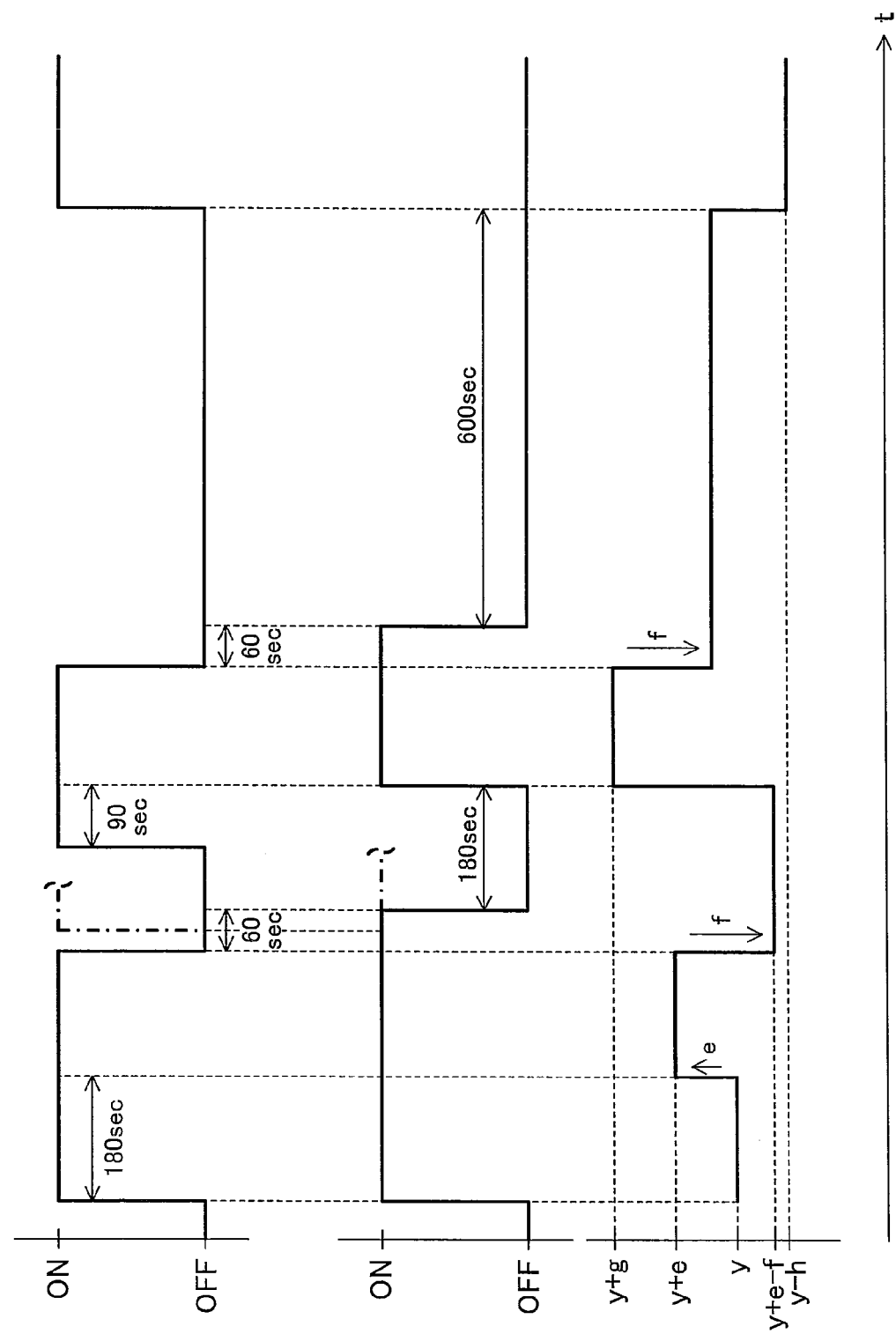
FIG. 8 is a diagram corresponding to FIG. 7 during a heating operation.

FIGS. 7 and 8 each show a timing diagram for a target value correction control for the compressor (11) of the air conditioner (1) according to Embodiment 3 of the present invention. Note that except that there is only one kind of ON signal output from the control interface (50), the controllers (30, 40) of the outdoor unit (10) and the indoor unit (20), the control interface (50), the main controller (60), etc., are substantially the same as those of Embodiment 1, and only part of the target value correction control is different from that of Embodiment 1. Therefore, the different part will be described below.

—Cooling Operation—

The target value correction control by the main controller (60) when the air conditioner (1) is in a cooling operation will be described below with reference to FIG. 7.

First, when the ON signal is output from the control interface (50), the compressor (11) is started (turned ON). In this process, the target value of the evaporation temperature (Te) is set to be x° C. when the ON signal is output. Note that the evaporation temperature (Te) is calculated based on the output signal from the suction pressure sensor (19).

If the ON signal has been output from the control interface (50) for 180 seconds or more, the target value of the evaporation temperature (Te) is decreased by a° C. to be (x−a)° C. This is for improving the cooling capacity to more quickly bring the indoor air temperature to the target temperature since the ON signal has been output for a relatively long period of time.

Then, simultaneously with the ON signal going OFF, the target value of the evaporation temperature (Te) is increased by b° C. Thus, since the load is small when the ON signal goes OFF, the target value of the evaporation temperature (Te) is then set to be accordingly higher, thereby achieving an energy-conserving operation of the compressor (11).

If the ON signal has been OFF continuously for 60 seconds, the compressor (11) is stopped (turned OFF), whereas if the ON signal is output from the control interface (50) within 60 seconds of the ON signal going OFF, the compressor (11) is not stopped but is kept operating (indicated by a one-dot chain line in the figure).

Note that although not shown in the figure, if the ON signal is output from the control interface (50) and turned OFF repeatedly a predetermined number of times (e.g., twice) or more during the 60-second period, a very large cooling capacity is not being required, and therefore the target value of the evaporation temperature (Te) is corrected to be increased.

Note that the 60-second period corresponds to the desired period of time of the present invention.

If the ON signal has been output from the control interface (50) continuously for 90 seconds or more while the re-activation of the compressor (11) is prohibited for the protection of the compressor (11) over a predetermined amount of time (the compressor protection period, which is 180 seconds in the present embodiment) since the stopping of the compressor (11), and if the compressor (11) is activated based on the ON signal after the elapse of the predetermined amount of time, the target value of the evaporation temperature (Te) is corrected to (x−c)° C. This is for compensating, after the activation of the compressor (11), for the loss which has occurred because the compressor (11) could not be activated for the protection thereof even though there was an output request from the control interface (50).

Where 600 seconds or more have elapsed since the stopping of the compressor (11) until it is activated next, the evaporation temperature (Te) is corrected to (x+d)° C. if the ON signal is output from the control interface (50). Such a correction control is performed because it is believed that a very large capacity is not being required since the compressor (11) has been stopped for a long time. In the present embodiment, the correction described above is performed if 600 seconds or more have elapsed since the stopping of the compressor (11) until it is activated next. However, the present invention is not limited thereto, and it may be any period as long as it is longer than the compressor protection period of the compressor (11).

—Heating Operation—

Next, a target value correction control by the main controller (60) when the air conditioner (1) is in a heating operation will now be described with reference to FIG. 8.

First, when the ON signal is output from the control interface (50), the compressor (11) is activated (turned ON), as in the case of a cooling operation. Then, the target value of the condensation temperature (Tc) is set to be y° C. if the ON signal is output. Note that the condensation temperature (Tc) is calculated based on the output signal from the discharge pressure sensor (18).

If the ON signal is output from the control interface (50) for 180 seconds or more, the target value of the condensation temperature (Tc) is increased by e° C. to be (y+e)° C. This is for improving the heating capacity to more quickly bring the indoor air temperature to the target temperature since the ON signal has been output for a relatively long period of time.

Then, the target value of the condensation temperature (Tc) is also decreased by PC simultaneously with the ON signal going OFF. Since it is believed that the load is small when the ON signal goes OFF, the target value of the condensation temperature (Tc) is then set to be lower, thereby achieving an energy-conserving operation of the compressor (11).

If the ON signal has been OFF continuously for 60 seconds, the compressor (11) is stopped (turned OFF), whereas if the ON signal is output from the control interface (50) within 60 seconds of the ON signal going OFF, the compressor (11) is not stopped but is kept operating (indicated by a one-dot chain line in the figure).

Note that although not shown in the figure, if the ON signal is output from the control interface (50) and turned OFF repeatedly a predetermined number of times (e.g., twice) or more during the 60-second period, a very large heating capacity is not being required, and therefore the target value of the condensation temperature (Tc) is corrected to be decreased. Note that the 60-second period corresponds to the desired period of time of the present invention.

If the ON signal has been output from the control interface (50) continuously for 90 seconds or more while the re-activation of the compressor (11) is prohibited for the protection of the compressor (11) over a predetermined amount of time (the compressor protection period, which is 180 seconds in the present embodiment) since the stopping of the compressor (11), and if the compressor (11) is activated based on the ON signal after the elapse of the predetermined amount of time, the target value of the condensation temperature (Tc) is corrected to (y+g)° C. This is for compensating, after the activation of the compressor (11), for the loss which has occurred because the compressor (11) could not be activated for the protection thereof even though there was an output request from the control interface (50).

Where 600 seconds or more have elapsed since the stopping of the compressor (11) until it is activated next, the evaporation temperature (Te) is corrected to (y−h)° C. if the ON signal is output from the control interface (50). Such a correction control is performed because it is believed that a very large capacity is not being required since the compressor (11) has been stopped for a long time. In the present embodiment, the correction described above is performed if 600 seconds or more have elapsed since the stopping of the compressor (11) until it is activated next. However, the present invention is not limited thereto, and it may be any period as long as it is longer than the compressor protection period of the compressor (11).

Note that the values a-h used in the target value correction control are not limited to those that satisfy the relationships shown in FIGS. 7 and 8, but may be set on site according to the capacity of the compressor (11) or the air conditioner (1), etc.

—Advantage of Embodiment 3—

In this embodiment having such a configuration, the target value of the evaporation temperature (Te) or the condensation temperature (Tc) of the compressor (11) is corrected in the capacity-increasing direction if the ON signal has been output from the control interface (50) for a predetermined amount of time or more. Therefore, in situations where a larger cooling capacity or heating capacity is required, the compressor (11) can be operated with an appropriate capacity.

When the ON signal output from the control interface (50) goes OFF, the target value is corrected in the capacity-decreasing direction so as to conserve the output of the compressor (11) in situations where the load is not very large.

When the ON signal has been output from the control interface (50) and turned OFF repeatedly a predetermined number of times or more within a desired period of time, the target value is corrected in the capacity-decreasing direction so as to conserve the output of the compressor (11) in situations where a very large capacity is not being required.

If the ON signal has been output from the control interface (50) continuously for a predetermined period of time during the compressor protection period in which the activation of the compressor (11) is prohibited for the protection of the compressor (11) over a predetermined amount of time, following the stopping of the compressor (11), and if the compressor (11) is activated immediately after the compressor protection period, the target value is corrected in the capacity-increasing direction. Then, it is possible to compensate for the loss of capacity which has occurred because the compressor (11) could not be activated for the compressor protection period, thereby preventing, as much as possible, the lowering of the air conditioning capacity due to the compressor protection period.

Moreover, if the ON signal is output from the control interface (50) while the compressor (11) has been stopped for a period of time longer than the compressor protection period, the target value is corrected in the capacity-decreasing direction so as to conserve the output of the compressor (11) in situations where the load is not very large.

Embodiment 4

Figure 9:
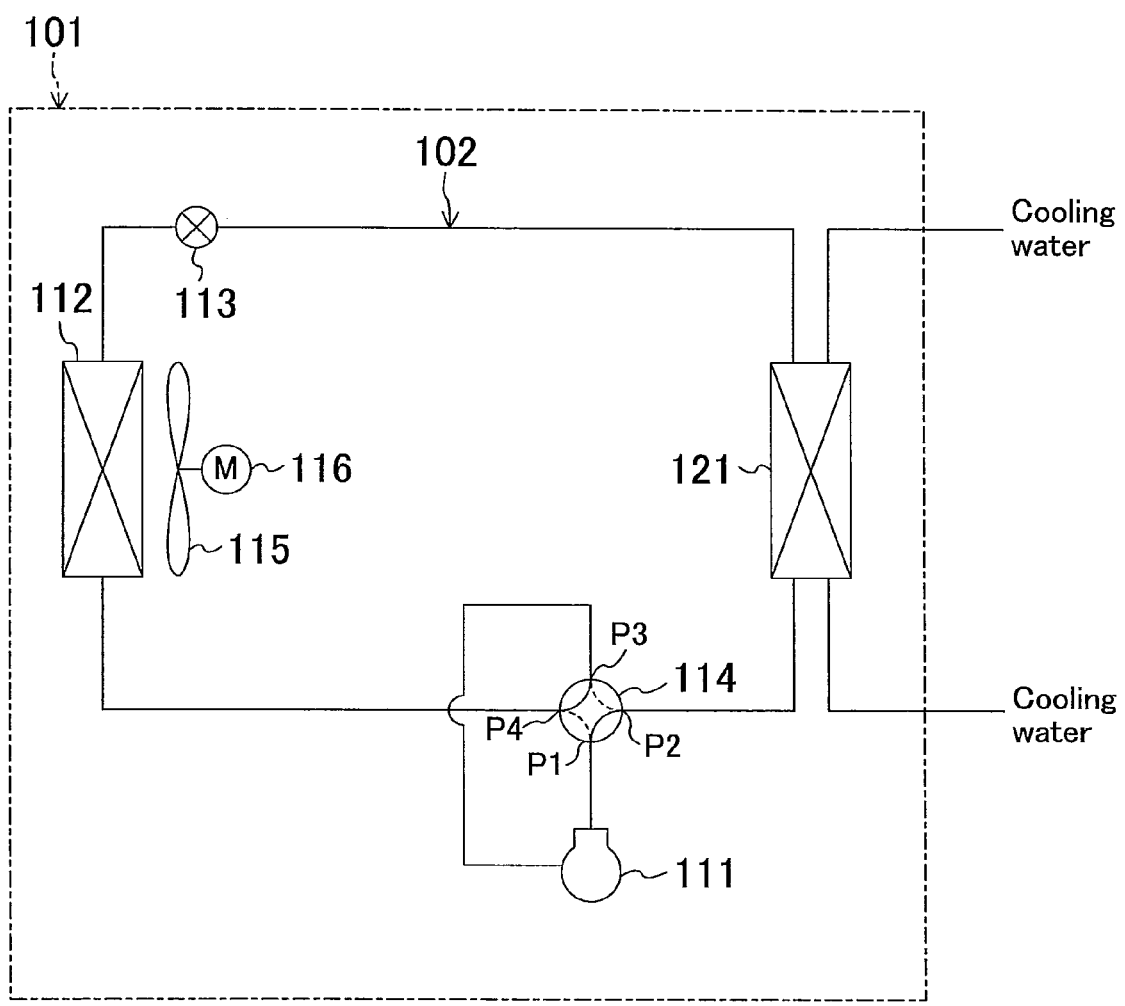
FIG. 9 is a piping diagram showing a configuration of an air conditioner according to Embodiment 4.

FIG. 9 shows a refrigerant circuit (102) of an air conditioner (101) according to Embodiment 4 of the present invention. The air conditioner (101) is different from Embodiment 1 above in that the outdoor unit and the indoor unit are integral with each other, and that one of the heat exchangers (the heat source-side heat exchanger) is of a water-cooled type.

Specifically, as in Embodiment 1 above, the air conditioner (101) includes a compressor (111), a utilization-side heat exchanger (112), an expansion valve (113), a four-way switching valve (114), a fan (115), and a heat source-side heat exchanger (121). Note that the compressor (111), the utilization-side heat exchanger (112), the expansion valve (113), the four-way switching valve (114) and the fan (115) are substantially the same as those of Embodiment 1, and will not be described in detail below.

The heat source-side heat exchanger (121) is configured so that a refrigerant circulating in a refrigerant circuit (102) is cooled by cooling water. Specifically, the heat source-side heat exchanger (121) includes therein a refrigerant passage in which the refrigerant in the refrigerant circuit (102) flows, and a cooling water passage in which the cooling water flows (not shown), wherein heat is exchanged between these passages. Note that the cooling water flowing through the heat source-side heat exchanger (121) exchanges heat with the ambient air in an external cooling tower (not shown), etc., via the cooling water pipe.

The air conditioner (101) having such a configuration performs the cooling operation when the four-way switching valve (114) is in the first state (a state indicated by a solid line in FIG. 1 in which the first port (P1) and the second port (P2) are connected together and the third port (P3) and the fourth port (P4) are connected together), and performs the heating operation when the four-way switching valve (14) is in the second state (a state indicated by a broken line in FIG. 1 in which the first port (P1) and the fourth port (P4) are connected together and the second port (P2) and the third port (P3) are connected together). In the cooling operation, the refrigerant circuit (102) performs a vapor-compression refrigeration cycle in which the utilization-side heat exchanger (112) functions as an evaporator and the heat source-side heat exchanger (121) as a condenser. On the other hand, in the heating operation, the refrigerant circuit (102) performs a vapor-compression refrigeration cycle in which the utilization-side heat exchanger (112) functions as a condenser and the heat source-side heat exchanger (121) as an evaporator.

Figure 10:
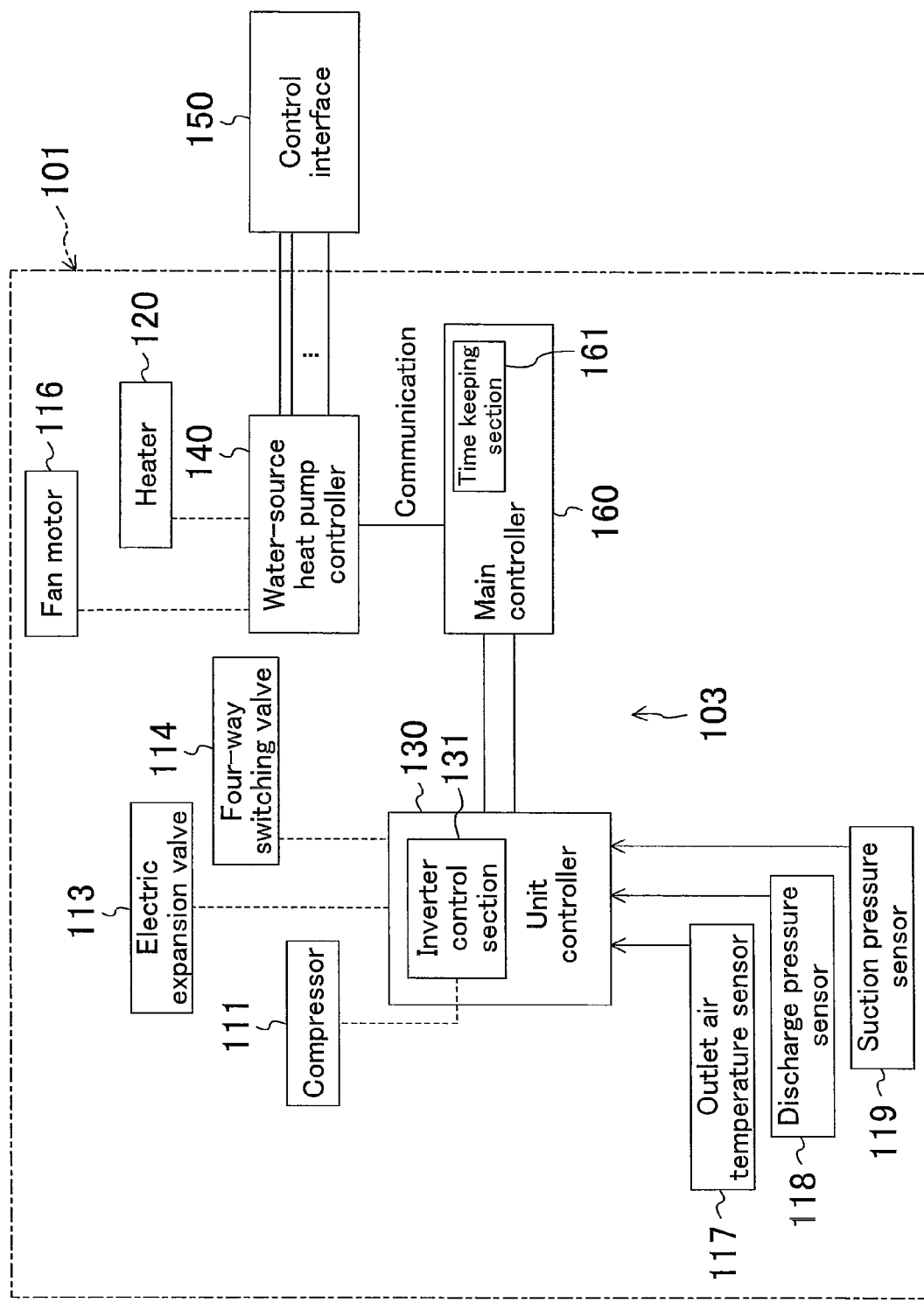
FIG. 10 is a block diagram showing the control block of the air conditioner.

The control system of the air conditioner (101) will be described below with reference to the control block shown in FIG. 10. The air conditioner (101) includes a unit controller (130) for controlling the compressor (111), the electric expansion valve (113) and the four-way switching valve (114), a water-source heat pump controller (140) for controlling a motor (116) for the fan (115) and a heater (120) for pre-heating, and a main controller (160) connected with the unit controller (130) and the water-source heat pump controller (140) so that electric signals can be exchanged therebetween.

The unit controller (130) includes an inverter control section (131) for controlling the compressor (111) using an inverter. As in Embodiment 1 above, the inverter control section (131) sets the target value of one of the indoor outlet air temperature and the discharge pressure or the suction pressure of the compressor (111) in order to control the compressor (111) using an inverter.

The water-source heat pump controller (140) is connected to the control interface (150) as a so-called "thermostat," which is a type of a remote controller installed in the room, so that electric signals can be exchanged therebetween. As in Embodiment 1 above, the control interface (150) outputs an ON/OFF-related signal (e.g., an ON signal, ON signals of different stages for different loads, etc.).

The signal output from the control interface (150) is transmitted in the form of a request signal to the main controller (160) via the water-source heat pump controller (140). In response to the request signal, the main controller (160) produces a correction signal for correcting the target value, and transmits the correction signal to the inverter control section (131).

Note that as in Embodiment 1 above, the main controller (160) includes a time keeping section (161), and receives output signals from an outlet air temperature sensor (117), a discharge pressure sensor (118) and a suction pressure sensor (119). The method for correcting the target value based on the output signal from the control interface (150) in the main controller (160) is also similar to that of Embodiment 1 above, and therefore will not be described below. Moreover, the control for protecting the compressor (111) is also similar to that of Embodiment 1 above.

—Advantage of Embodiment 4—

As described above, according to this embodiment, also for a water-source heat pump, the level of comfort and energy conservation can be improved by correcting the target value used for controlling the compressor (111) by means of the main controller (160) based on an ON/OFF-related signal output from the control interface (150), as in Embodiment 1 above.

—Variation of Embodiment 4—

Figure 11:
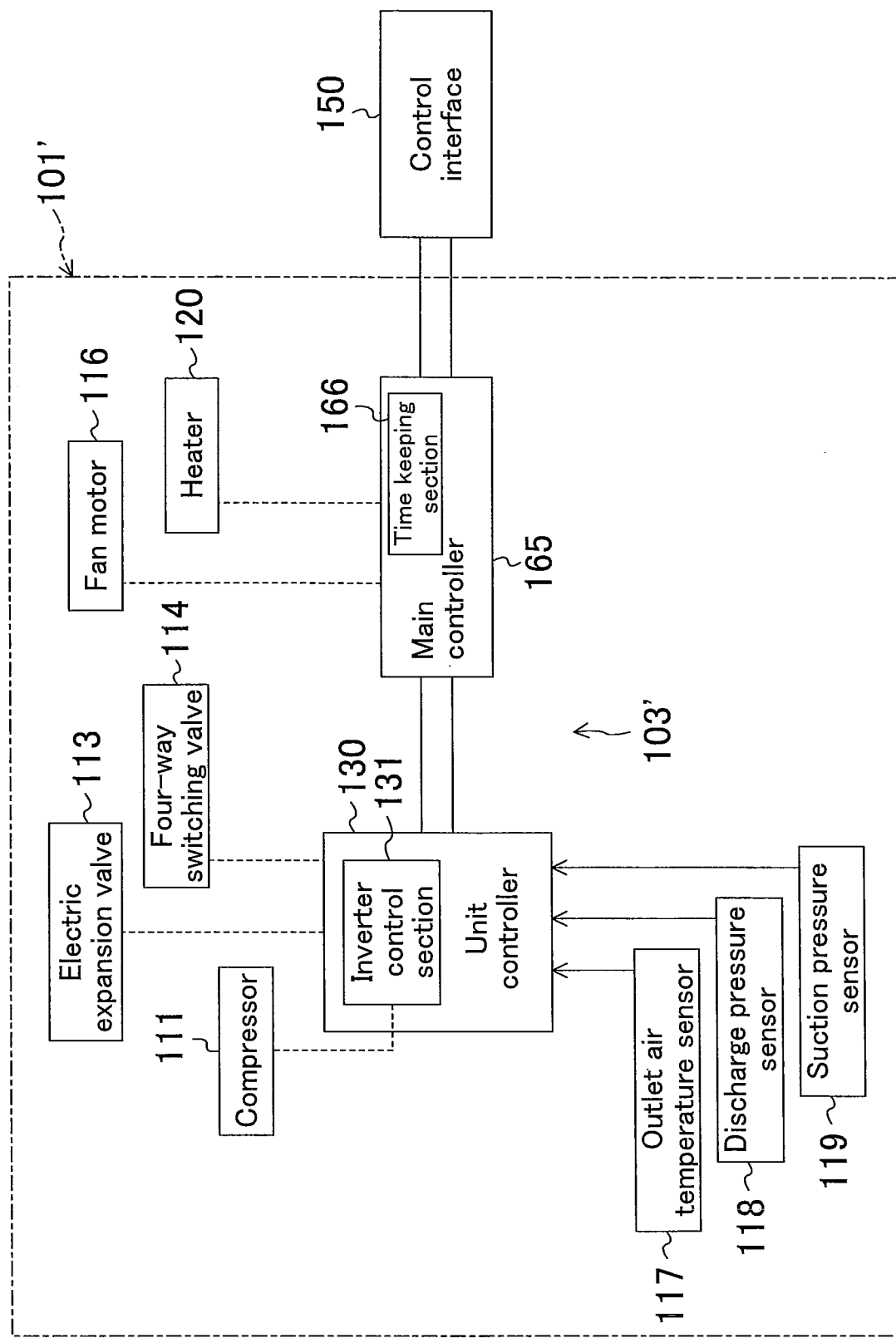
FIG. 11 is a block diagram showing the control block of an air conditioner according to a variation.

This variation differs from Embodiment 4 above in that a main controller (165) serves also as a water-source heat pump controller, as shown in FIG. 11.

Specifically, with an air conditioner (101') of this variation, the motor (116) for the fan (115) and the heater (120) are directly controlled by the main controller (165), and the control interface (150) is also connected to the main controller (165) so that electric signals can be exchanged therebetween.

Thus, a signal output from the controller interface (150) is directly sent to the main controller (165), wherein a correction signal for correcting the target value of the compressor (111) is produced. Note that the main controller (165) also includes a time keeping section (166), as in Embodiments 1 and 4 above.

Other Embodiments

The embodiments above may employ any of the following configurations.

While each of the embodiments above employs the control interface (50) capable of being switched between two levels so as to accommodate the partial load and the full load of the compressor (11), the present invention is not limited thereto, and the control interface (50) may be only capable of being turned ON/OFF, or may be capable of switching the load of the compressor (11) between three or more levels. When the load of the compressor (11) can be switched between three or more levels, the level of the target value is increased more as the load is higher, whereas if the load decreases, the level of the target value is decreased more as the load is smaller, as in Embodiment 1 above.

While the target value for the inverter control of the compressor (111) is corrected based on the duration of the ON signal output from the control interface (50) or the duration of the OFF state where the ON signal is not output, in each of the embodiments above, the present invention is not limited thereto, and the target value of the inverter control of the compressor (111) may be corrected based on the frequency of the ON signal within a predetermined amount of time. That is, when the output frequency of the ON signal is high, it is estimated that the load of air-conditioning the room is relatively high, and therefore the target value is increased in such a case. On the other hand, when the output frequency of the ON signal is low, it is estimated that the load of air-conditioning the room is relatively low, and therefore the target value is decreased in such a case.

Industrial Applicability

As described above, in a configuration where only a signal related to ON/OFF of a compressor is output, an air conditioner of the present invention makes it possible to control the compressor using an inverter according to the load required, and it is therefore useful particularly as an air-conditioner including such a thermostat as those commonly used in North America, for example.

The invention claimed is:

1. An operation controller for a compressor for controlling an operating state of the compressor based on an ON signal output from a thermostat control terminal when there is a difference between an indoor air temperature and a designated temperature, the operation controller comprising:
   an inverter controller that controls, during operation of the compressor, the compressor using an inverter such that any one of an indoor outlet air temperature, an evaporation temperature and a condensation temperature of an air conditioner including the compressor, and a suction pressure and a discharge pressure of the compressor reaches a target value; and
   a main controller that outputs a signal for controlling the operating state of the compressor based on the ON signal to the inverter controller, wherein
   the main controller
      outputs, to the inverter controller, a signal for changing the target value, to which the inverter controller is currently controlling the compressor, in a capacity-increasing direction with respect to an operation capacity of the compressor if the ON signal has been output continuously for a predetermined amount of time during operation of the compressor,
      outputs, to the inverter controller, a signal for changing the target value, to which the inverter controller is currently controlling the compressor, in a capacity-decreasing direction with respect to the operation capacity of the compressor if output of the ON signal is stopped during the operation of the compressor
      outputs a signal for stopping the operation of the compressor to the inverter controller if the ON signal has not been output for a predetermined amount of time during the operation of the compressor, and
      outputs, to the inverter controller, a signal for further changing the target value, to which the inverter controller is currently controlling the compressor, in a capacity-decreasing direction with respect to the operation capacity of the compressor if switching between a state where the ON signal is output and a state where the ON signal is not output is performed a certain number of times or more during the predetermined amount of time after the stop of the output of the ON signal.

2. The operation controller for a compressor of claim 1, wherein the target value is changed in a capacity-increasing direction if the ON signal has been output continuously for a predetermined period of time during a compressor protection period following stopping of the compressor in which an activation of the compressor is prohibited over a certain period of time, and if the compressor is activated immediately after the compressor protection period.

3. The operation controller for a compressor of claim 1, wherein the target value is changed in a capacity-decreasing direction if the compressor has been stopped for a period of time longer than a compressor protection period following stopping of the compressor in which an activation of the compressor is prohibited over a certain period of time.

4. The operation controller for a compressor of claim 1, wherein a compressor protection control for changing the target value so as not to go beyond a range over which the compressor can be used is performed.

5. The operation controller for a compressor of claim 1, wherein the ON signal is a signal for switching a load of the compressor among a plurality of levels.

6. An air conditioner comprising a refrigerant circuit along which a plurality of heat exchangers and a compressor are connected together for performing a refrigeration cycle by circulating a refrigerant through the refrigerant circuit,
wherein the air conditioner includes the operation controller for the compressor of claim 1.

7. The air conditioner of claim 6, wherein an ambient air is taken in, and heat is exchanged between the air and the refrigerant in at least one of the heat exchangers, after which the air is sent into a room.

8. The air conditioner of claim 6, wherein a heat source-side heat exchanger, among the heat exchangers, is configured so that a refrigerant flowing therein exchanges heat with a cooling water.

9. An operation controller for a compressor for controlling an operating state of the compressor based on an ON signal output from a thermostat control terminal when there is a difference between an indoor air tempature and a designated temperature, the operation controller comprising:
an inverter controller that controls, during operation of the compressor, the compressor using an inverter such that any one of an indoor outlet air temperature, an evaporation temperature, and a condensation temperature of an air conditioner including the compressor, and a suction pressure and a discharge pressure of the compressor reaches a target value; and
a main controller that outputs a signal for controlling the operating state of the compressor based on the ON signal to the inverter controller, wherein
the main controller
outputs, to the inverter controller, a signal for changing the target value, to which the inverter controller is currently controlling the compressor, in a capacity-increasing direction with respect to the operation capacity of the compressor if, during the operation of the compressor, a frequency of the ON signal within a predetermined amount of time is higher than a predetermined frequency, and
outputs, to the inverter controller, a signal for changing the target value, to which the inverter controller is currently controlling the compressor, in a capacity-decreasing direction with respect to the operation capacity of the compressor if, during the operation of the compressor, a frequency of the ON signal within a predetermined amount of time is lower than the predetermined frequency.

* * * * *